US010768746B1

(12) United States Patent
Pant et al.

(10) Patent No.: US 10,768,746 B1
(45) Date of Patent: Sep. 8, 2020

(54) QUASI-CONTINUOUS-TIME SAMPLING OF DISCRETE-TIME SAMPLED SIGNALS

(71) Applicant: Apple Inc., Cupertino, CA (US)

(72) Inventors: Vivek Pant, San Jose, CA (US); Sumant Ranganathan, Saratoga, CA (US); Moshe Malkin, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/591,032

(22) Filed: May 9, 2017

Related U.S. Application Data

(60) Provisional application No. 62/334,359, filed on May 10, 2016, provisional application No. 62/334,380, filed on May 10, 2016.

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01)

(58) Field of Classification Search
CPC ............................... G06F 3/044; G06F 3/0418
See application file for complete search history.

(56) References Cited

U.S. PATENT DOCUMENTS

| 5,251,123 A | 10/1993 | Reiffel et al. |
| 5,483,261 A | 1/1996 | Yasutake |
| 5,488,204 A | 1/1996 | Mead et al. |
| 5,825,352 A | 10/1998 | Bisset et al. |
| 5,835,079 A | 11/1998 | Shieh |
| 5,880,411 A | 3/1999 | Gillespie et al. |
| 6,188,391 B1 | 2/2001 | Seely et al. |
| 6,310,610 B1 | 10/2001 | Beaton et al. |

(Continued)

FOREIGN PATENT DOCUMENTS

| JP | 2000-163031 A | 6/2000 |
| JP | 2002-342033 A | 11/2002 |

OTHER PUBLICATIONS

Lee, S.K. et al. (Apr. 1985). "A Multi-Touch Three Dimensional Touch-Sensative Tablet," *Proceedings of CHI: ACM Conference on Human Factors in Computing Systems*, pp. 21-25.

(Continued)

*Primary Examiner* — Michael J Jansen, II
(74) *Attorney, Agent, or Firm* — Kubota & Basol LLP

(57) ABSTRACT

Improved sensing can include modified sampling and/or processing to improve performance against noise due to environmental variations and interference. In some examples, improved interference rejection can be achieved by sampling a sensor multiple times during settled periods. In some examples, the excitation signal and sampling window can be dynamically adjusted to satisfy drift and/or interference specifications based on various operating conditions or the operating environment. In some examples, drift performance can be traded off to improve interference performance. In some examples, improved immunity to environmental variations can be achieved by equalizing sensor outputs in accordance with characterization of the sensing system. In some examples, improved performance can be achieved by sampling the sensor continuously and using an optimized window function to improve performance against noise.

19 Claims, 20 Drawing Sheets

(56) References Cited

U.S. PATENT DOCUMENTS

| | | |
|---|---|---|
| 6,323,846 B1 | 11/2001 | Westerman et al. |
| 6,690,387 B2 | 2/2004 | Zimmerman et al. |
| 7,015,894 B2 | 3/2006 | Morohoshi |
| 7,184,064 B2 | 2/2007 | Zimmerman et al. |
| 7,378,856 B2 | 5/2008 | Peine et al. |
| 7,643,011 B2 | 1/2010 | O'Connor et al. |
| 7,663,607 B2 | 2/2010 | Hotelling et al. |
| 8,026,904 B2 | 9/2011 | Westerman |
| 8,125,455 B2 * | 2/2012 | Land .................. G06F 3/0418 178/18.01 |
| 8,350,816 B2 | 1/2013 | Toyoshima |
| 8,479,122 B2 | 7/2013 | Hotelling et al. |
| 8,525,801 B2 | 9/2013 | Huang et al. |
| 8,570,804 B2 * | 10/2013 | Shalvi .................. G11C 16/26 365/185.02 |
| 8,599,611 B2 * | 12/2013 | Shalvi .................. G11C 16/26 365/185.02 |
| 8,619,054 B2 | 12/2013 | Philipp et al. |
| 8,682,949 B2 | 3/2014 | Matsushima |
| 8,830,201 B2 | 9/2014 | Huang et al. |
| 8,988,362 B2 | 3/2015 | Yeh et al. |
| 9,078,066 B2 | 7/2015 | Sheng et al. |
| 9,086,993 B2 * | 7/2015 | Sokolov .............. G06F 11/1072 |
| 9,292,381 B2 * | 3/2016 | Shalvi .................. G11C 16/26 |
| 9,310,952 B2 | 4/2016 | Hanauer et al. |
| 9,360,512 B2 | 6/2016 | Luong |
| 9,442,586 B2 | 9/2016 | Hirata |
| 9,501,182 B2 | 11/2016 | Graumann et al. |
| 9,513,727 B2 | 12/2016 | Sheng et al. |
| 9,535,530 B2 | 1/2017 | Cho et al. |
| 9,625,997 B2 | 4/2017 | Heim |
| 9,697,077 B2 * | 7/2017 | Sokolov .............. G06F 11/1072 |
| 9,823,760 B2 | 11/2017 | Sheng et al. |
| 9,846,502 B2 | 12/2017 | Lee |
| 9,927,476 B2 | 3/2018 | Philipp et al. |
| 10,067,593 B2 * | 9/2018 | Mohindra ............... G06F 3/047 |
| 2003/0067451 A1 | 4/2003 | Tagg et al. |
| 2005/0068044 A1 | 3/2005 | Peine et al. |
| 2006/0197753 A1 | 9/2006 | Hotelling |
| 2007/0279395 A1 | 12/2007 | Philipp et al. |
| 2008/0158169 A1 | 7/2008 | O'Connor et al. |
| 2008/0158176 A1 * | 7/2008 | Land .................. G06F 3/0418 345/173 |
| 2008/0158182 A1 | 7/2008 | Westerman |
| 2009/0115737 A1 | 5/2009 | Toyoshima |
| 2009/0244029 A1 | 10/2009 | Huang et al. |
| 2010/0200310 A1 | 8/2010 | Yeh et al. |
| 2011/0055305 A1 | 3/2011 | Matsushima |
| 2011/0227865 A1 | 9/2011 | Baek |
| 2011/0261008 A1 | 10/2011 | Joharapurkar et al. |
| 2012/0026788 A1 * | 2/2012 | Shalvi .................. G11C 16/26 365/185.02 |
| 2012/0026789 A1 * | 2/2012 | Shalvi .................. G11C 16/26 365/185.02 |
| 2012/0176179 A1 | 7/2012 | Harders et al. |
| 2012/0313890 A1 * | 12/2012 | Mohindra ............. G06F 3/0416 345/174 |
| 2012/0326734 A1 | 12/2012 | Cho et al. |
| 2013/0285982 A1 | 10/2013 | Graumann et al. |
| 2013/0307822 A1 | 11/2013 | Huang et al. |
| 2014/0022189 A1 | 1/2014 | Sheng et al. |
| 2014/0023210 A1 | 1/2014 | Sheng et al. |
| 2014/0111223 A1 | 4/2014 | Philipp et al. |
| 2014/0146006 A1 | 5/2014 | Luong |
| 2014/0157084 A1 * | 6/2014 | Shalvi .................. G11C 16/26 714/768 |
| 2014/0298139 A1 * | 10/2014 | Sokolov .............. G06F 11/1072 714/763 |
| 2014/0375571 A1 | 12/2014 | Hirata |
| 2014/0379287 A1 | 12/2014 | Luong |
| 2015/0022490 A1 | 1/2015 | Heim |
| 2015/0091845 A1 | 4/2015 | Park |
| 2015/0268753 A1 | 9/2015 | Sheng et al. |
| 2015/0309870 A1 * | 10/2015 | Sokolov .............. G06F 11/1072 714/721 |
| 2016/0034089 A1 | 2/2016 | Kano et al. |
| 2016/0147370 A1 * | 5/2016 | Mohindra ............. G06F 3/0416 345/174 |
| 2016/0370926 A1 | 12/2016 | Lee |
| 2017/0024032 A1 | 1/2017 | Godshill et al. |
| 2017/0090609 A1 | 3/2017 | Petrovic et al. |
| 2017/0102815 A1 | 4/2017 | Portmann |
| 2017/0212635 A1 | 7/2017 | Cordeiro et al. |
| 2018/0129350 A1 | 5/2018 | Jiang |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Final Office Action received for U.S. Appl. No. 15/591,037, dated Feb. 13, 2019, 25 pages.

Non-Final Office Action received for U.S. Appl. No. 15/591,037, dated Jun. 12, 2018, 23 pages.

Non-Final Office Action received for U.S. Appl. No. 15/591,037, dated Sep. 18, 2019, 24 pages.

* cited by examiner

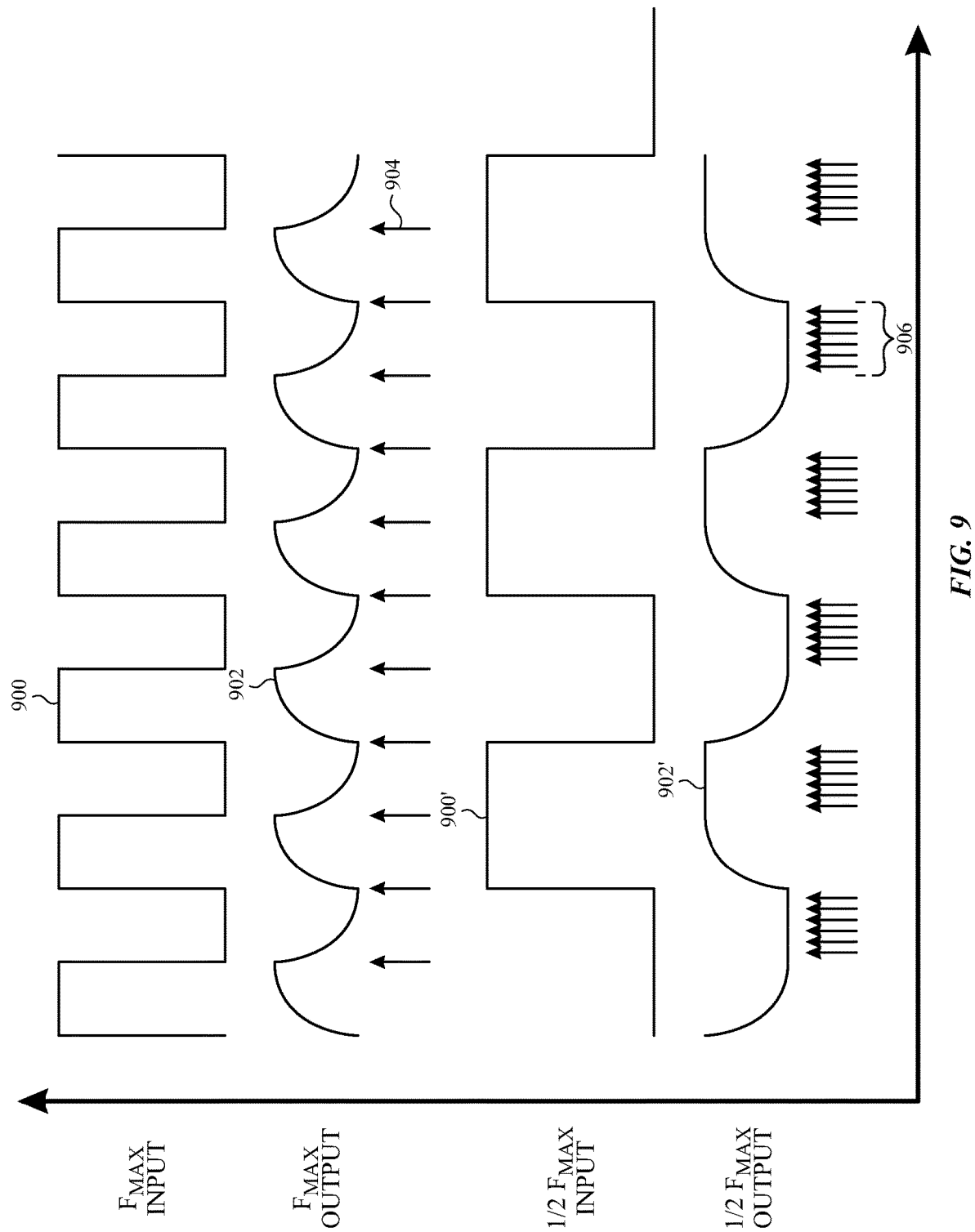

QUASI-CONTINUOUS-TIME SAMPLING OF DISCRETE-TIME SAMPLED SIGNALS

CROSS REFERENCES TO RELATED APPLICATION

This application claims the benefit under 35 U.S.C. 119(e) of U.S. Patent Application No. 62/334,359, filed May 10, 2016, and Patent Application No. 62/334,380, filed May 10, 2016, the contents of which are incorporated herein by reference in their entirety for all purposes.

FIELD OF THE DISCLOSURE

This relates generally to sampling and/or processing sensor output, and more particularly, to quasi-continuous sampling and processing output from a sensor, equalizing sensor output under various sampling schemes and/or processing continuously sampled sensor output using tailored windows.

BACKGROUND OF THE DISCLOSURE

Many types of input devices are presently available for performing operations in a computing system, such as buttons or keys, mice, trackballs, trackpads, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface. Touch sensor panel sensing performance, however, can be degraded by noise in measured capacitances due to environmental variations or interference from external or internal sources.

SUMMARY

This relates to an improved touch sensing system with robust touch sensing performance capable of reducing drift due to parasitic effects and external or internal interference sources. In some examples, quasi-continuous sampling during settled periods of a sensor output can improve interference rejection (e.g., harmonic, broadband, narrowband). In some examples, the frequency and sampling window can be dynamically adjusted to satisfy drift and/or interference specifications based on various operating conditions or the operating environment. In some examples, drift performance can be traded off to improve interference performance.

This relates to an improved touch sensing system with robust touch sensing performance capable of reducing drift due to parasitic effects and external or internal interference sources. In some examples, quasi-continuous sampling during settled periods of a sensor output (e.g., in a sensing system using a switched-capacitor circuit) can improve interference rejection (e.g., harmonic, broadband, narrowband). In some examples, the frequency and sampling window can be dynamically adjusted to satisfy drift and/or interference specifications based on various operating conditions or the operating environment. In some examples, drift performance can be traded off to improve interference performance. In some examples, drift performance can be traded off to improve interference performance. In some examples, improved immunity to environmental variations can be achieved by equalizing switched capacitor sensor outputs based on a characterization of a range of sensor output responses. In some examples, improved performance can be achieved by continuously sampling the sensor and using a tailored (e.g., optimized) window function to reduce drift and interference.

BRIEF DESCRIPTION OF THE DRAWINGS

FIG. 9 illustrates exemplary timing diagrams demonstrating a tradeoff between operating frequency and a number of samples according to examples of the disclosure.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to an improved touch sensing system with robust touch sensing performance capable of reducing drift due to parasitic effects and external or internal interference sources. In some examples, quasi-continuous sampling during settled periods of a sensor output (e.g., in a sensing system using a switched-capacitor circuit) can improve interference rejection (e.g., harmonic, broadband, narrowband). In some examples, the excitation signal (e.g., a fundamental frequency of the excitation signal) and sampling window (e.g., duration) can be dynamically adjusted to satisfy drift and/or interference specifications based on various operating conditions or the operating environment. In some examples, drift performance can be traded off to improve interference performance. In some examples, improved immunity to environmental variations can be achieved by equalizing switched capacitor sensor outputs based on a characterization of a range of sensor output responses. In some examples, improved performance can be achieved by continuously sampling the sensor and using a tailored (e.g., optimized) window function to reduce drift and interference.

Figure 1A:
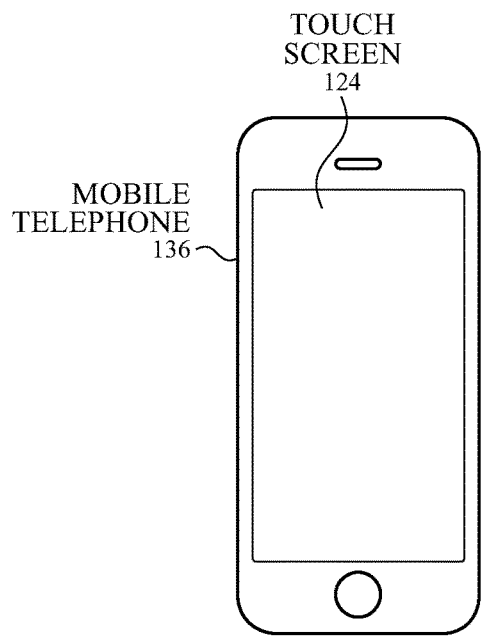
FIGS. 1A-1D illustrate exemplary systems that can implement sampling and processing techniques according to examples of the disclosure.
Figure 1B:
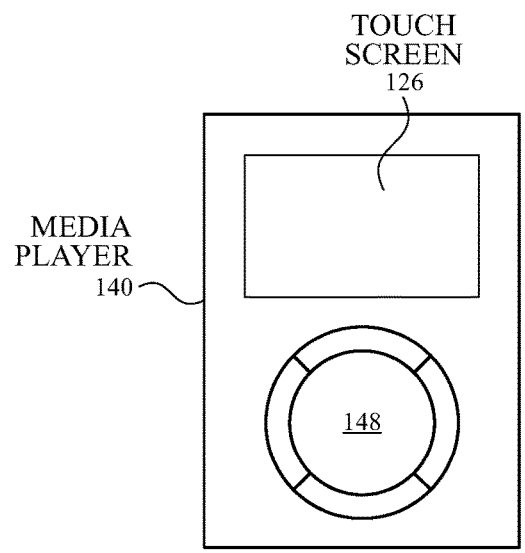
Figure 1C:
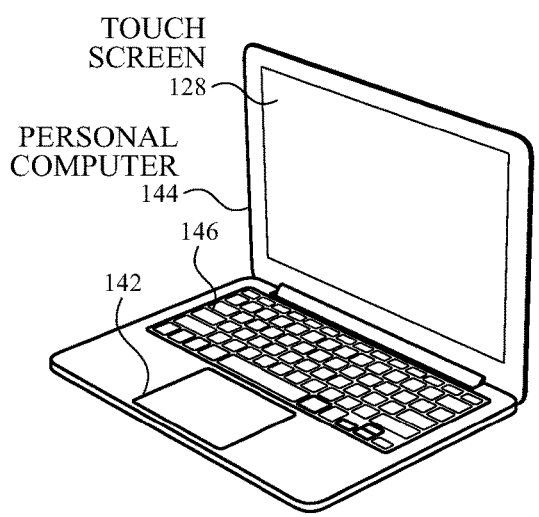
Figure 1D:
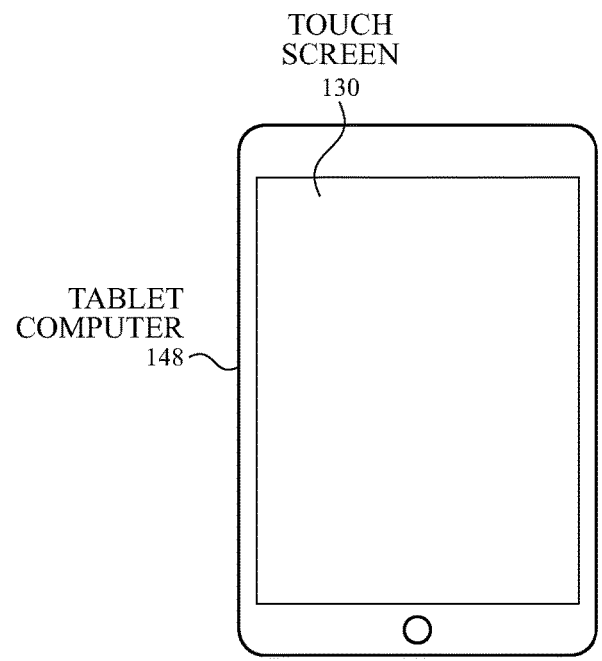

FIGS. 1A-1D illustrate exemplary systems that can implement sampling and/or processing techniques according to examples of the disclosure. FIG. 1A illustrates an example mobile telephone 136 that includes a touch screen 124 and can implement sampling and processing techniques according to examples of the disclosure. FIG. 1B illustrates an example digital media player 140 that includes a touch screen 126 and can implement sampling and processing techniques according to examples of the disclosure. FIG. 1C illustrates an example personal computer 144 that includes a touch screen 128 and can implement sampling and processing techniques according to examples of the disclosure. Additionally, the sampling and processing techniques for sensors can be implemented for other touch interfaces without a display, such as for trackpad 146 in FIG. 1C. FIG. 1D illustrates an example tablet computing device 148 that includes a touch screen 130 and can implement sampling and processing techniques according to examples of the disclosure. Sampling and processing techniques for sensors can be implemented in other devices including wearable devices.

Touch screens 124, 126, 128 and 130 can be based on, for example, self-capacitance or mutual capacitance sensing technology, or another touch sensing technology. For example, in a self-capacitance based touch system, an individual electrode with a self-capacitance to ground can be used to form a touch pixel (touch node) for detecting touch. As an object approaches the touch node, an additional capacitance to ground can be formed between the object and the touch node. The additional capacitance to ground can result in a net increase in the self-capacitance seen by the touch node. This increase in self-capacitance can be detected and measured by a touch sensing system (e.g., one including switched-capacitor circuits) to determine the positions of multiple objects when they touch (or come into proximity to) the touch screen. A mutual capacitance based touch system can include, for example, drive regions and sense regions, such as drive lines and sense lines. For example, drive lines can be formed in rows while sense lines can be formed in columns (i.e., orthogonal). Touch pixels (touch nodes) can be formed at the intersections or adjacencies (in single layer configurations) of the rows and columns. During operation, the rows can be stimulated with an alternating current (AC) waveform and a mutual capacitance can be formed between the row and the column of the touch node. As an object approaches the touch node, some of the charge being coupled between the row and column of the touch node can instead be coupled onto the object. This reduction in charge coupling across the touch node can result in a net decrease in the mutual capacitance between the row and the column and a reduction in the AC waveform being coupled across the touch node. This reduction in the charge-coupled AC waveform can be detected and measured by the touch sensing system (e.g., including switched capacitor circuits) to determine the positions of multiple objects when they touch (or come into proximity to) the touch screen. In some examples, a touch screen can be multi-touch, single touch, projection scan, full-imaging multi-touch, or any capacitive touch.

Figure 2:
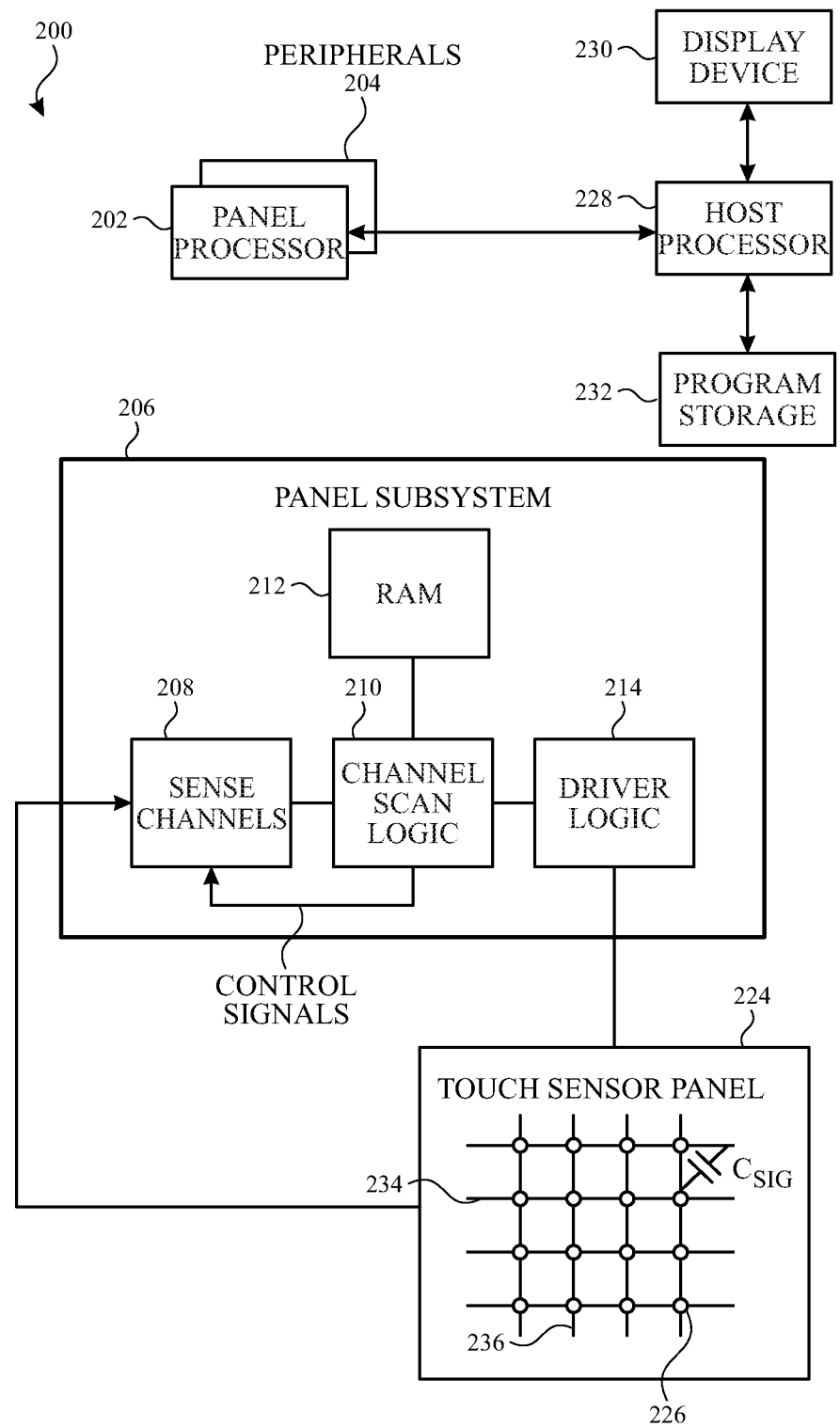
FIG. 2 illustrates an exemplary computing system including a capacitive touch sensor panel according to examples of the disclosure.

FIG. 2 illustrates an exemplary computing system 200 including a capacitive touch sensor panel 224 according to examples of the disclosure. Computing system 200 can include one or more panel processors 202, peripherals 204, and panel subsystem 206. Peripherals 204 can include, but are not limited to, random access memory (RAM) or other types of memory or storage, watchdog timers and the like. Panel subsystem 206 can include, but is not limited to, one or more sense channels 208, channel scan logic (analog or digital) 210 and driver logic (analog or digital) 214. Touch sensor panel 224 can include row electrodes 234 and column electrodes 236. In mutual capacitance touch sensor panel examples, stimulation signals from driver logic 214 can be driven onto row electrodes 234, and sense signals on column electrodes 236 can be sensed by sense channels 208. Touch or proximity events can alter the capacitive coupling Csig between row electrodes 234 and column electrodes 236 at touch nodes 226 and cause a change to the sense signals on column electrodes 236. However, in self-capacitance touch sensor panel examples, driver logic 214 and sense channel blocks 208 can be combined, and the touch sensor panel can be driven and sensed on both row electrodes 234 and column electrodes 236. Channel scan logic 210 can access RAM 212, autonomously read data from sense channels 208 and provide control for the sense channels. In addition, channel scan logic 210 can control driver logic 214 to generate stimulation signals that can be sequentially or simultaneously applied to the row electrodes 234 of touch sensor panel 224. In some examples, panel subsystem 206, panel processor 202 and peripherals 204 can be integrated into a single application specific integrated circuit (ASIC) that can be referred to herein as a touch controller.

In mutual capacitance sensing examples, touch sensor panel 224 can include a capacitive sensing medium having one or more drive electrodes and one or more sense electrodes. The drive and sense electrodes can be formed from a transparent conductive medium such as Indium Tin Oxide (ITO) or Antimony Tin Oxide (ATO), although other transparent and non-transparent materials such as copper can also be used. The drive and sense electrodes can be formed on a single side of a transparent substrate. Each adjacency of drive and sense electrodes can represent a capacitive sensing node and can be viewed as touch picture element (touch pixel) or touch node 226, which can be particularly useful when touch sensor panel 224 is viewed as capturing an "image" of touch or proximity. (In other words, after panel subsystem 206 has determined whether a touch or proximity event has been detected at each sense electrode in the touch sensor panel, the pattern of sense electrodes in the touch sensor panel at which a touch or proximity event occurred can be viewed as an "image" of touch or proximity (e.g., a pattern of fingers touching or hovering over the panel).) The capacitance between the drive and sense electrodes and local system ground can appear as a stray capacitance Cstray, and the capacitance at the intersections of the drive and sense electrodes, i.e., the touch nodes, can appear as a mutual signal capacitance Csig between the drive and sense electrodes when the given drive electrode is stimulated with an AC signal. The presence of a finger or other object (such as a stylus) near or on the touch sensor panel can be detected by measuring changes to a signal charge present at the nodes being touched, which can be a function of Csig. Each sense electrode of touch sensor panel 224 can be coupled to a sense channel 208 in panel subsystem 206. Touch sensor panel 224 can cover a portion or all of a surface of a device.

In self-capacitance sensing examples, touch sensor panel 224 can include a capacitive sensing medium having a plurality of sense electrodes. The sense electrodes can be formed from a transparent conductive medium such as ITO or ATO, although other transparent and non-transparent materials such as copper can also be used. The sense electrodes can be formed on a single side of a transparent substrate. In some examples, the sense electrodes can be viewed as touch picture element (touch pixel) or touch node 226, which can be particularly useful when touch sensor panel 224 is viewed as capturing an "image" of touch or proximity. The capacitance between the sense electrodes and system ground can represent the self-capacitance of those electrodes. The presence of a finger or other object (such as a stylus) near or on the touch sensor panel can be detected by measuring changes to the self-capacitance of nearby sense electrodes. Each sense electrode of touch sensor panel 224 can be coupled to a sense channel 208 in panel subsystem 206. Touch sensor panel 224 can cover a portion or all of a surface of a device.

Computing system 200 can also include host processor 228 for receiving outputs from panel processor 202 and performing actions based on the outputs that can include, but are not limited to, moving one or more objects such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to panel processing, and can be coupled to program storage 232 and display device 230 such as an LCD display for providing a UI to a user of the device. Display device 230 together with touch sensor panel 224, when located partially or entirely under the touch sensor panel, can form a touch screen.

In some examples, touch sensor panel 224 and display device 230 together can form an integrated touch screen in which touch sensing circuit elements of the touch sensing system (e.g., sense electrodes) can be integrated into the display pixel stackups of display device 230. The circuit elements in an integrated touch screen can include, for example, elements that can exist in LCD or other displays, such as one or more display pixel transistors (e.g., thin film transistors (TFTs)), gate lines, data lines, pixel electrodes and common electrodes. It is noted that circuit elements are not limited to whole circuit components, such as a whole capacitor, a whole transistor, etc., but can include portions of circuitry, such as only one of the two plates of a parallel plate capacitor. In some configurations, each common electrode in an integrated touch screen can serve as a multi-function circuit element that can operate as display circuitry of the display system of the touch screen and can also operate as elements of the touch circuitry of the touch sensing system. Specifically, each common electrode can operate as a common electrode of the display circuitry of the touch screen (e.g., during a display phase), and can also operate as a common electrode (i.e., a sense electrode) of the touch circuitry of the touch screen (e.g., during a touch sensing phase). It should be understood that a display phase and a touch sensing phase of an integrated touch screen may be operated at the same time, e.g., partially or completely overlapping, or the display phase and touch sensing phase may operate at different times.

In general, each of the touch sensing circuit elements may be either a multi-function circuit element that can form part of the touch circuitry and can perform one or more other functions, such as forming part of the display circuitry, or may be a single-function circuit element that can operate as touch circuitry only. Similarly, each of the display circuit elements may be either a multi-function circuit element that can operate as display circuitry and perform one or more other functions, such as operating as touch circuitry, or may be a single-function circuit element that can operate as display circuitry only. Therefore, in some examples, some of the circuit elements in the display pixel stackups can be multi-function circuit elements and other circuit elements may be single-function circuit elements. In other examples, all of the circuit elements of the display pixel stackups may be single-function circuit elements.

Note that one or more of the functions described herein can be performed by firmware stored in memory (e.g., one of the peripherals 204 in FIG. 2) and executed by panel processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable medium storage can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, universal serial bus (USB) memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Although examples of the disclosure may be described herein primarily in terms of capacitive touch sensor panels and capacitive touch sensing, it should be understood that capacitive touch sensor panels can be capable of measuring a capacitive profile that can change in the presence of an object touching or hovering proximate to the capacitive touch sensor panel. The term "touch" as used herein is intended to encompass both touch and proximity sensing.

Figure 3A:
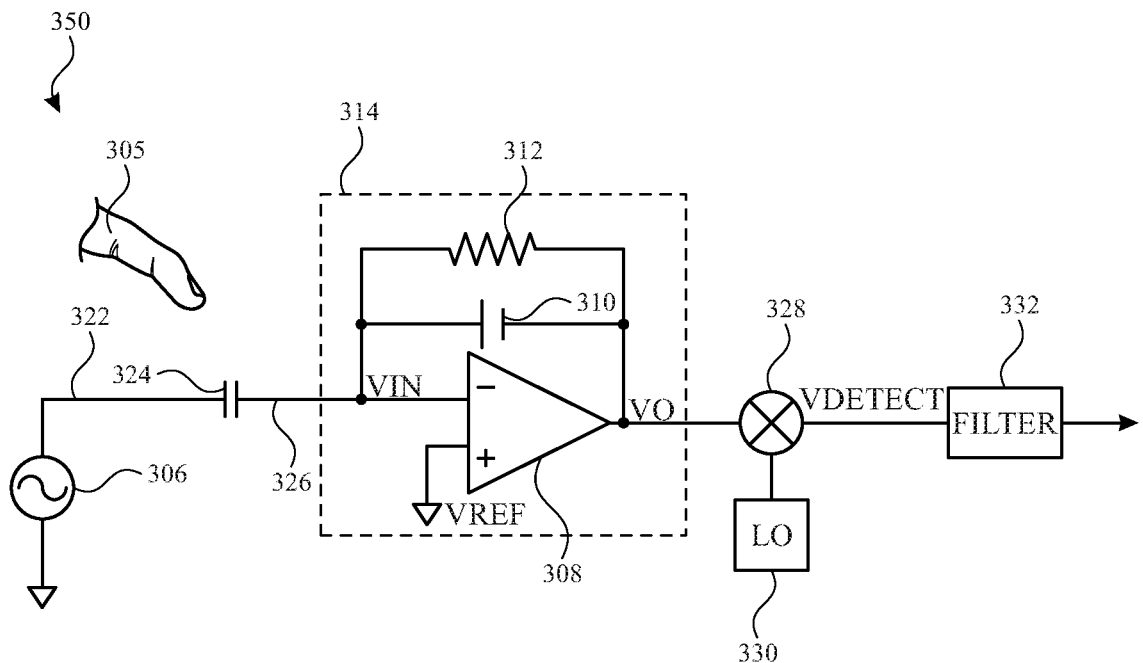
FIG. 3A illustrates an exemplary touch sensor circuit corresponding to a self-capacitance touch node and sensing circuit according to examples of the disclosure.
Figure 3B:
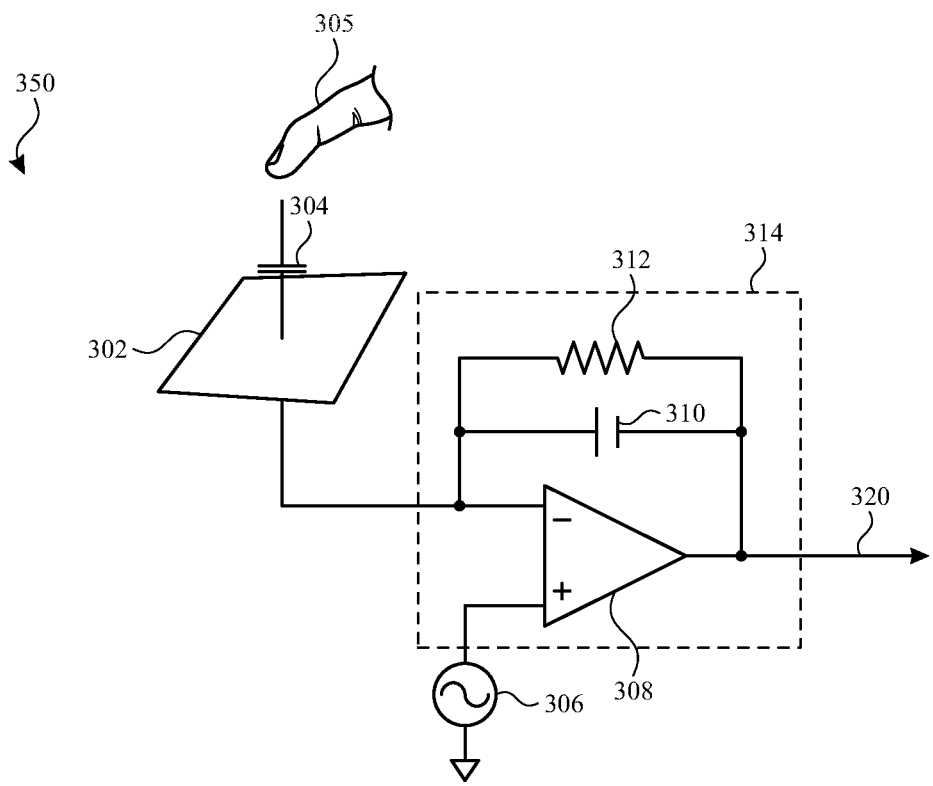
FIG. 3B illustrates an example configuration in which common electrodes can form portions of the touch sensing circuitry of a touch sensing system according to examples of the disclosure.
Figure 3C:
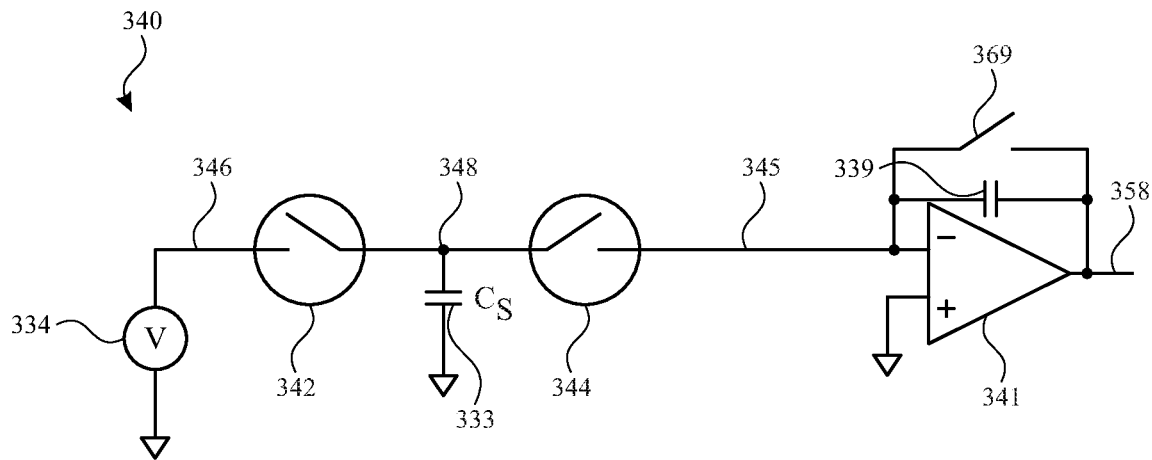
FIG. 3C is an exemplary schematic diagram of a sensor including a switched capacitor circuit according to examples of the disclosure.

Some techniques described herein (e.g., quasi-continuous sampling, sensor output equalizing, and tailored windowing) can be applied to improve performance in a sensing system using a switched capacitor circuit (e.g., as illustrated in FIG. 3C). Additionally, some techniques (e.g., tailored windowing) can be used in a continuous-time sensing system without switched capacitors (e.g., as illustrated in FIGS. 3A and 3B).

FIG. 3A illustrates an exemplary touch sensor circuit 350 corresponding to a mutual-capacitance drive electrode 322 and sense electrode 326 and sensing circuit 314 according to examples of the disclosure. Drive electrode 322 can be stimulated by stimulation signal (e.g., from an AC voltage source 306). Stimulation signal can be capacitively coupled to sense electrode 326 through mutual capacitance 324 between drive electrode 322 and the sense electrode. When a finger or object 305 approaches the touch node created by the intersection of drive electrode 322 and sense electrode 326, mutual capacitance 324 can be altered. This change in mutual capacitance 324 can be detected to indicate a touch or proximity event at the touch node, as described previously and below. The sense signal coupled onto sense electrode 326 can be received by sensing circuit 314. Sensing circuit 314 can include operational amplifier 308 and at least one of a feedback resistor 312 and a feedback capacitor 310. FIG. 3A illustrates a general case in which both resistive and capacitive feedback elements are utilized. The sense signal (referred to as Vin) can be inputted into the inverting input of operational amplifier 308, and the non-inverting input of the operational amplifier can be coupled to a reference voltage Vref. Operational amplifier 308 can drive its output to voltage Vo to keep Vin equal to Vref, and can therefore maintain Vin constant or virtually grounded. Therefore, the gain of sensing circuit 314 can be mostly a function of the ratio of mutual capacitance 324 and the feedback impedance, comprised of resistor 312 and/or capacitor 310. The output of sensing circuit 314 Vo can be filtered and heterodyned or homodyned by being fed into multiplier 328, where Vo can be multiplied with local oscillator 330 to produce Vdetect. Vdetect can be inputted into filter 332. One skilled in the art will recognize that the placement of filter 332 can be varied; thus, the filter can be placed after multiplier 328, as illustrated, or two filters can be employed: one before the multiplier and one after the multiplier. In some examples, there can be no filter at all. The direct current (DC) portion of Vdetect can be used to determine if a touch or proximity event has occurred.

FIG. 3B illustrates an exemplary touch sensor circuit 300 corresponding to a self-capacitance touch node electrode 302 and sensing circuit 314 according to examples of the disclosure. Touch node electrode 302 can have an inherent self-capacitance to ground associated with it, and also an additional self-capacitance to ground that is formed when an object, such as finger 305, is in proximity to or touching the electrode. The total self-capacitance to ground of touch node electrode 302 can be illustrated as capacitance 304. Touch node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize any parasitic capacitance effect caused by a variable feedback resistor. Touch node electrode 302 can be coupled to the inverting input (−) of operational amplifier 308. An AC voltage source 306 (Vac) can be coupled to the non-inverting input (+) of operational amplifier 308. Touch sensor circuit 300 can be configured to sense changes in the total self-capacitance 304 of the touch node electrode 302 induced by a finger or object either touching or in proximity to the touch sensor panel. Output 320 can be used by a processor to determine the presence of a proximity or touch event, or the output can be inputted into a discrete logic network to determine the presence of a proximity or touch event.

FIG. 3C is an exemplary schematic diagram of a sensor including a switched capacitor circuit (referred to herein as a switched capacitor sensor) according to examples of the disclosure. The switched capacitor sensor 340 can output a voltage 358 dependent on the proximity of an object to a conductive sense electrode (sense node), represented as sensor capacitance 333. The switched capacitor sensor 340 can include two electrical switches 342 and 344 (e.g., FET-switches), forming at least a part of the switched capacitor circuit, coupled in series and having a common node 348, an input node 346, and an output node 345. The sensor electrode can also be coupled to the common node 348 as illustrated by sensor capacitance 333. A power supply 334, coupled between reference ground and the input node 346, can provide charge to the switched capacitor sensor. The two electrical switches 342 (input switch) and 344 (output switch) can be operated in sequence to control the flow of charge from the power supply 334 a current-to-voltage translation device 341 (e.g., a transimpedance amplifier) and to an integrating capacitor 339 to generate voltage 358 at the output. At the end of the sequence (for example, the sequence described below), the voltage 358 at the output from the current-to-voltage translation device 341 can be measured. The voltage 358 can be dependent on the proximity of an object to the sensor electrode. Integrating capacitor 339 can be discharged by closing electrical switch 369 (e.g., until the voltage across the integrating capacitor 339 is near zero).

Switched capacitor sensor operation can begin with electrical switches 342, 344 and 369 in the open state as shown in FIG. 3C. The electrical switch 369 can then be closed to discharge the integrating capacitor 339, and then can be opened. Electrical switch 342 can then be closed to allow charge to flow between the power supply 334 and the common node 348 (e.g., until the voltage across the electrical switch 342 becomes zero). The charge can accumulate on the sense electrode charging sensor capacitance 333. The electrical switch 342 can then be opened and electrical switch 344 can be closed to allow the charge accumulated in sensor capacitance 333 to discharge to the integrating capacitor 339 (e.g., until the voltage across electrical switch is becomes zero). Multiple cycles of the electrical switches 342 and 344 can occur to produce a voltage on the integrating capacitor 339 that reflects the proximity of an object to the sense electrode.

It should be understood that the switched capacitor sensor 340 in FIG. 3C is but one example, and that different sensor architectures can be employed to perform discrete and/or quasi-continuous sampling, including different components and arrangements than illustrated in FIG. 3C. In some examples, output from a continuously sampling system can be processed to generate discrete and/or quasi-continuous samples. For example, a demodulation waveform can include a pulse train to generate discrete and/or quasi-continuous samples from a continuously sampled sensor output.

To achieve stable, high-precision touch sensing measurements, a touch sensing system can include discrete-time switched-capacitance circuits for measuring capacitance values. The system can be stimulated, for example, with a square wave excitation pulse (or an approximation of a square wave, such as a trapezoidal wave) and a capacitance measurement can be sampled after charge-settling. Sampling a discrete-time switched-capacitance circuit that is stimulated with square wave excitation after charge-settling can produce a high-precision capacitance measurement for small capacitance values. Additionally, environmental variation related drift (e.g., due to process variation, temperature drift, aging, etc.) can be reduced by keeping offsets small, for example, by using a guard or shield against external parasitic capacitance effects during capacitance measurements. Although often described herein as a sensing system including a switched-capacitor circuit (or as a sensing system with a switched capacitor sensor) that can be stimulated with a square wave, it should be understood that the sensing system can generate discrete and/or quasi-continuous samples in other ways (e.g., without the use of a switched-capacitor circuit) and the excitation signal/pulse can include other waveforms than a square wave (e.g., sine waves, triangle waves, trapezoidal waves, sawtooth waves, etc.).

Figure 4:
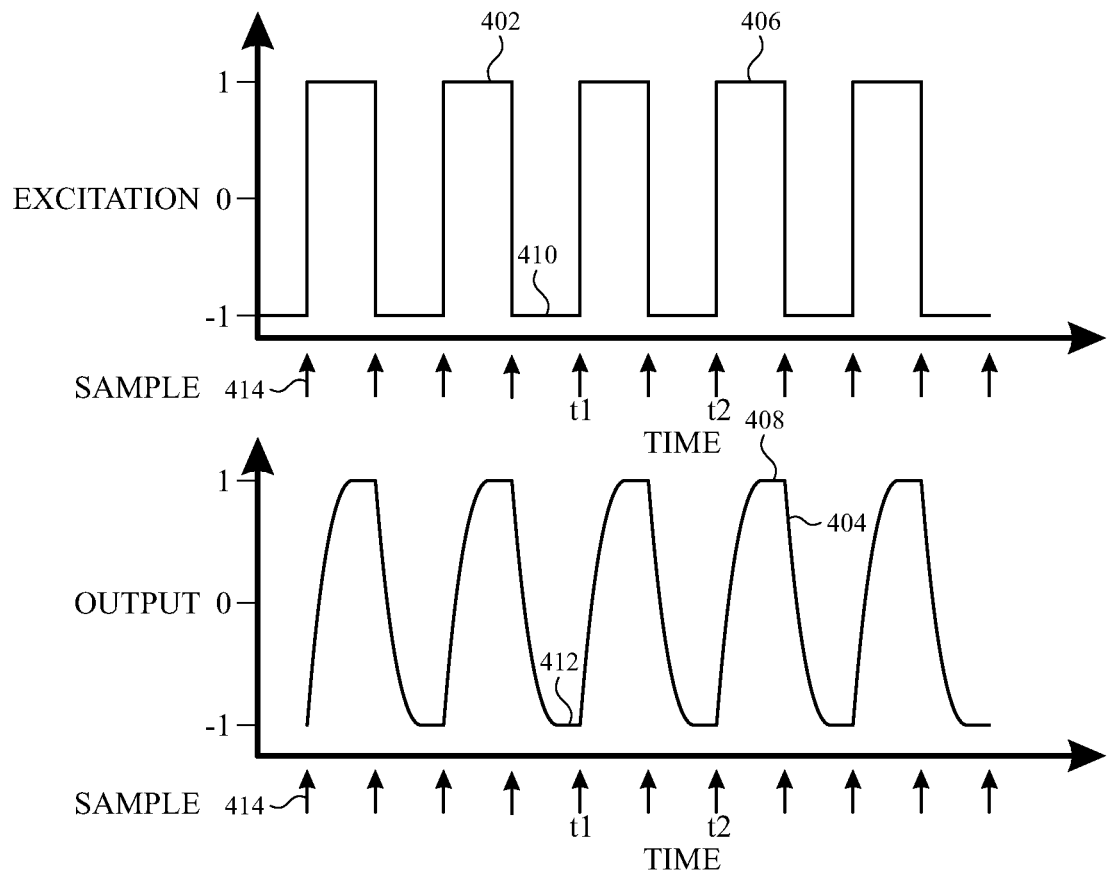
FIG. 4 illustrates exemplary waveforms for a discrete-time switched-capacitance touch sensing system according to examples of the disclosure.

FIG. 4 illustrates exemplary waveforms for a discrete-time switched-capacitance touch sensing system according to examples of the disclosure. The exemplary waveforms are illustrated with normalized amplitudes for simplicity. As discussed herein, the sensor can be stimulated with a square wave excitation signal as represented by excitation signal 402. The sensor output signal 404 represents the response of the sensor to the excitation signal 402. As illustrated, the sensor output signal 404 generally follows the excitation signal 402, such that after a transient period, the sensor output signal 404 settles to a settled value. In some examples, the settled value can correspond to the excitation signal 402. For example, at time t1 the excitation signal 402 is at its low value 410, and after settling, the sensor output signal 404 is also at the sensor output low value 412. Likewise, at time t2 the excitation signal 402 is at its high value 406, and after settling, the sensor output signal 404 is also at the sensor output high value 408.

As illustrated by arrows 414, the sample of the sensor output signal 404 can be taken after the output has settled to a settled value, such that the parasitic capacitances of the touch sensor panel do not significantly affect the final measurement (e.g., within a tolerance threshold), for example. In some examples, the sample can be taken a moment before (e.g., within a threshold period of time) the transition of excitation signal 402. Sampling before the transition can enable the system to operate at a higher frequency, because for a given period the sensor output signal 404 is given the most time to settle when sampled before the next transition of the excitation signal 402. As described herein, the operating frequency can refer to the frequency corresponding (according to known relationships between frequency and duration, for example) to the duration of a repeating portion of the excitation signal (i.e., the period for a periodic excitation signal). The operating frequency may also be referred to herein as a fundamental frequency, the frequency at which significant energy of the system can appear (additional energy may appear at or near harmonics, for example). Operating at a higher frequency can be beneficial in that it can provide an increased range of frequencies that can be selected to avoid interference from internal or external inference sources. The touch sensing system can select a frequency from among multiple available frequencies at which to operate the sensor. The multiple available frequencies can include a range of frequencies including a minimum frequency, a maximum frequency, and a number of discrete intermediate frequencies. In some examples, the sensor can operate at $f_{max}$, which can correspond to the maximum operating frequency (fundamental frequency of the excitation signal) of the touch sensing system that allows the sensor output signal 404 to settle and be sampled before the transition of the excitation signal 402. In some examples, the sensor can operate at a frequency lower than $f_{max}$.

It should be understood that although the excitation signal herein is often described as a square wave, other excitation signals can be used including sine waves, triangle waves, sawtooth waves, etc.

A discrete-time touch sensing system based, for example, on discrete-time switched-capacitance circuits as described above, however, can be susceptible to interference at harmonics of the frequency of the excitation pulse, for example (or at other frequencies). Sampling the high bandwidth signal of a switched-capacitance circuit with a single discrete sample can result, for example, in higher frequency interference aliasing into the bandwidth of the touch sensor panel. As a result, the touch sensing system based on discrete-time switched-capacitance circuits can experience coupling of external noise and/or interference that can result in less stable and noisier capacitance measurements.

Figure 5A:
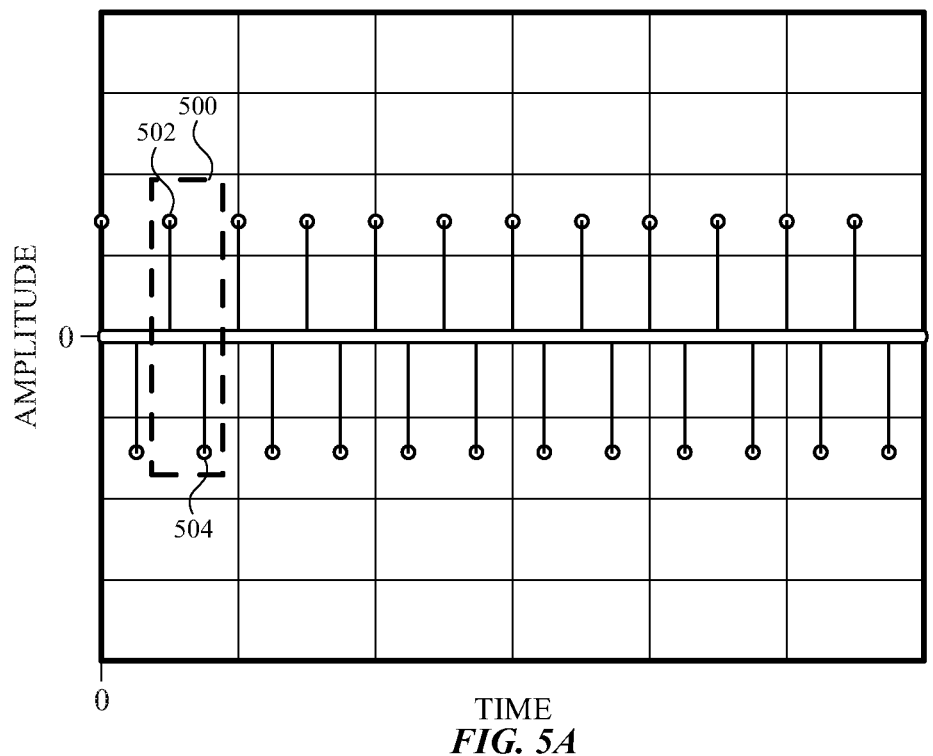
FIGS. 5A-5C illustrate exemplary time domain and frequency domain plots of windowed output of a discrete-time switched capacitor sensing system according to examples of the disclosure.
Figure 5B:
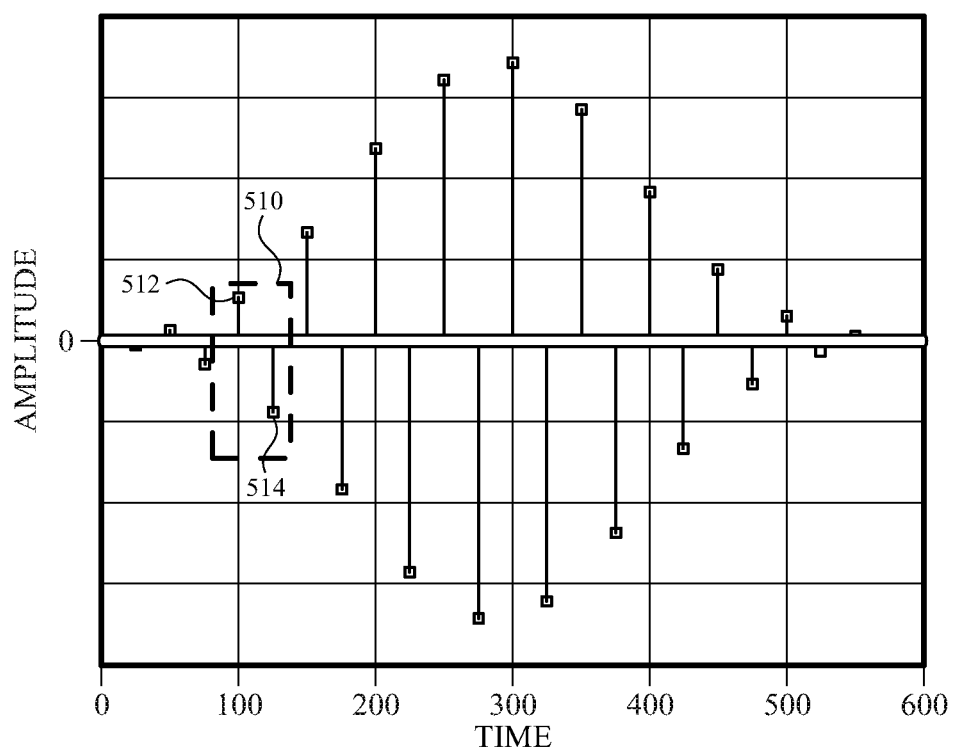
Figure 5C:
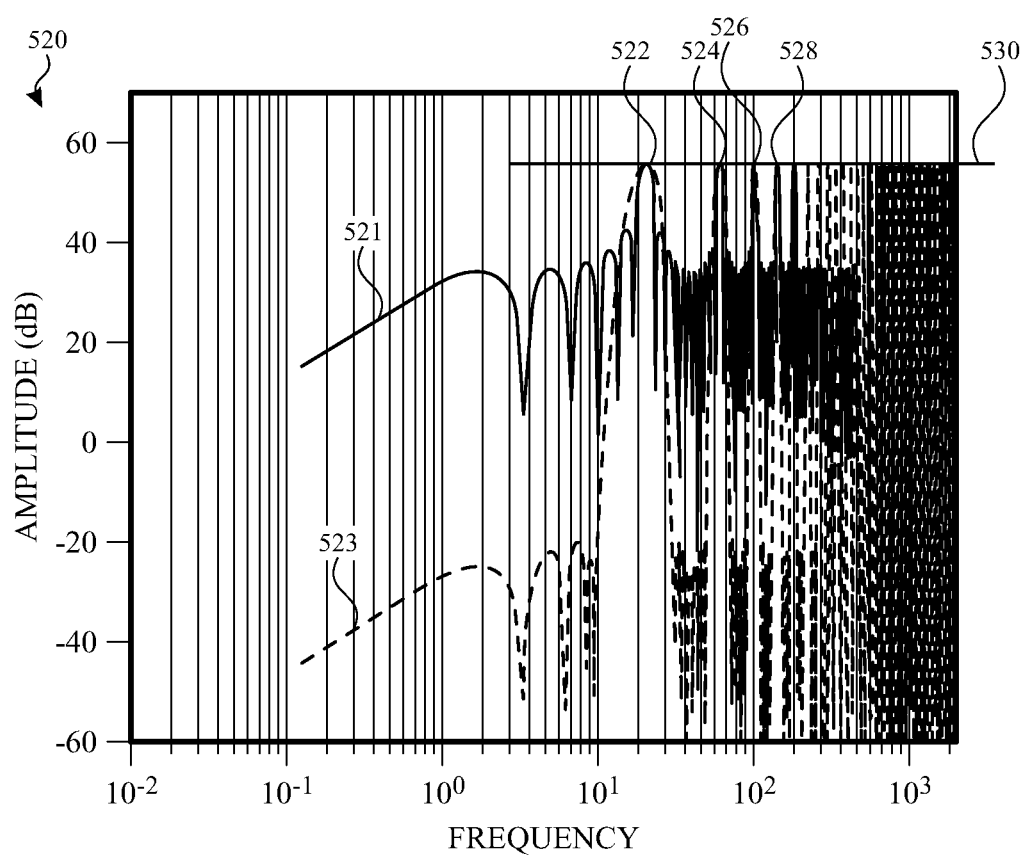

FIGS. 5A-5C illustrate exemplary time domain and frequency domain plots of windowed output of a discrete-time sensing system (e.g., including a switched capacitor) according to examples of the disclosure. FIG. 5A illustrates an exemplary time domain plot of a rectangular-windowed output of a discrete-time switched capacitor sensor according to examples of the disclosure. The output of the sensor can be sampled twice for each period of the square wave excitation pulse. For example, the samples 502 and 504 in box 500 can correspond to samples taken in response to one period of the excitation pulse. Sample 502 can correspond to a sample of the settled output taken corresponding on the high value of the excitation pulse, and sample 504 can correspond to a sample of the settled output taken corresponding to the low value of the excitation pulse. Due to the rectangular window (e.g., a rectangular window function applied to generate a demodulation waveform to demodulate the sensor output), the illustrated samples can have the same weighting applied. Taken together, the windowed samples can be combined to generate a capacitance measurement for the sensor.

FIG. 5B illustrates an exemplary time domain plot of a Taylor-windowed output of a discrete-time switched capacitor sensor according to examples of the disclosure. The output of the sensor can be sampled twice for each period of the square wave excitation pulse. For example, the samples 512 and 514 in box 510 can correspond to samples taken in response to one period of the excitation pulse. Sample 512 can correspond to a sample of the settled output taken corresponding on the high value of the excitation pulse, and sample 514 can correspond to a sample of the settled output taken corresponding to the low value of the excitation pulse. Due to the Taylor window (e.g., a Taylor window function applied to generate a demodulation waveform to demodulate the sensor output), the illustrated samples can have different weighting applied according to the Taylor window (for example, peaking in the center of the window function and going to zero at the edges of the window function). Taken together, the windowed samples can be combined to generate a capacitance measurement for the sensor.

FIG. 5C illustrates an exemplary frequency domain plot corresponding to FIGS. 5A and 5B according to examples of the disclosure. Plot 520 of FIG. 5C includes a fundamental peak 522 at the frequency of operation of the sensor, as well as peaks at the higher order harmonics of the fundamental frequency. For example, first harmonic peak 524, second harmonic peak 526 and third harmonic peak 528 can be at harmonics of the fundamental peak 522. As illustrated, the location of the peaks can be the same for both the frequency representation of the rectangular window 521 and the frequency representation of the Taylor window 523. The shaping of the Taylor window can reduce the amplitude of the frequency representation of the Taylor window 523 with respect to the frequency representation of the rectangular window 521 away from the fundamental frequency (and harmonics), in exchange for some widening of the peak at the fundamental frequency (and harmonics). As illustrated in FIG. 5C, external or internal noise at the fundamental frequency can interfere with the sensor output and degrade performance. In practice, interference at the fundamental frequency can be avoided by operating the touch sensing system at a different frequency. However, FIG. 5C also illustrates that for a given operating frequency, the noise at harmonics of the fundamental frequency (or at other frequencies) can also interfere with the sensor output as it is not attenuated. As line 530 shows, harmonics of the fundamental frequency pass the same amplitude signal, leaving the discrete-time (e.g., switched-capacitor) sensing system susceptible to noise from internal and external interference at harmonics of the operating frequency (and from other noisy frequencies).

It should be understood that although rectangular and Taylor windows are illustrated in FIGS. 5A-5C, other windows (also referred to as window functions) can be applied to the sensor output samples. For example, a triangular window, Hamming window, Hanning window, Gaussian window, Kaiser window, etc. can be used. Additionally, it should be understood that non-linear processing (e.g., median, rank, polynomial filters, etc.), or adaptive processing can be used to process the multiple samples from the settled portion of the sensor output.

In some examples, interference rejection of the sensor (e.g., one including a switched capacitor circuit) can be improved by performing quasi-continuous, rather than discrete, sampling during a settled portion of the sensor output signal. Sampling the sensor output signal multiple times during the settled portion of the output signal (rather than once as performed in discrete-time systems) can reduce aliasing and reduce the susceptibility of the sensor to noise (e.g., at or near harmonics of the operating frequency), as described in more detail below.

Figure 6:
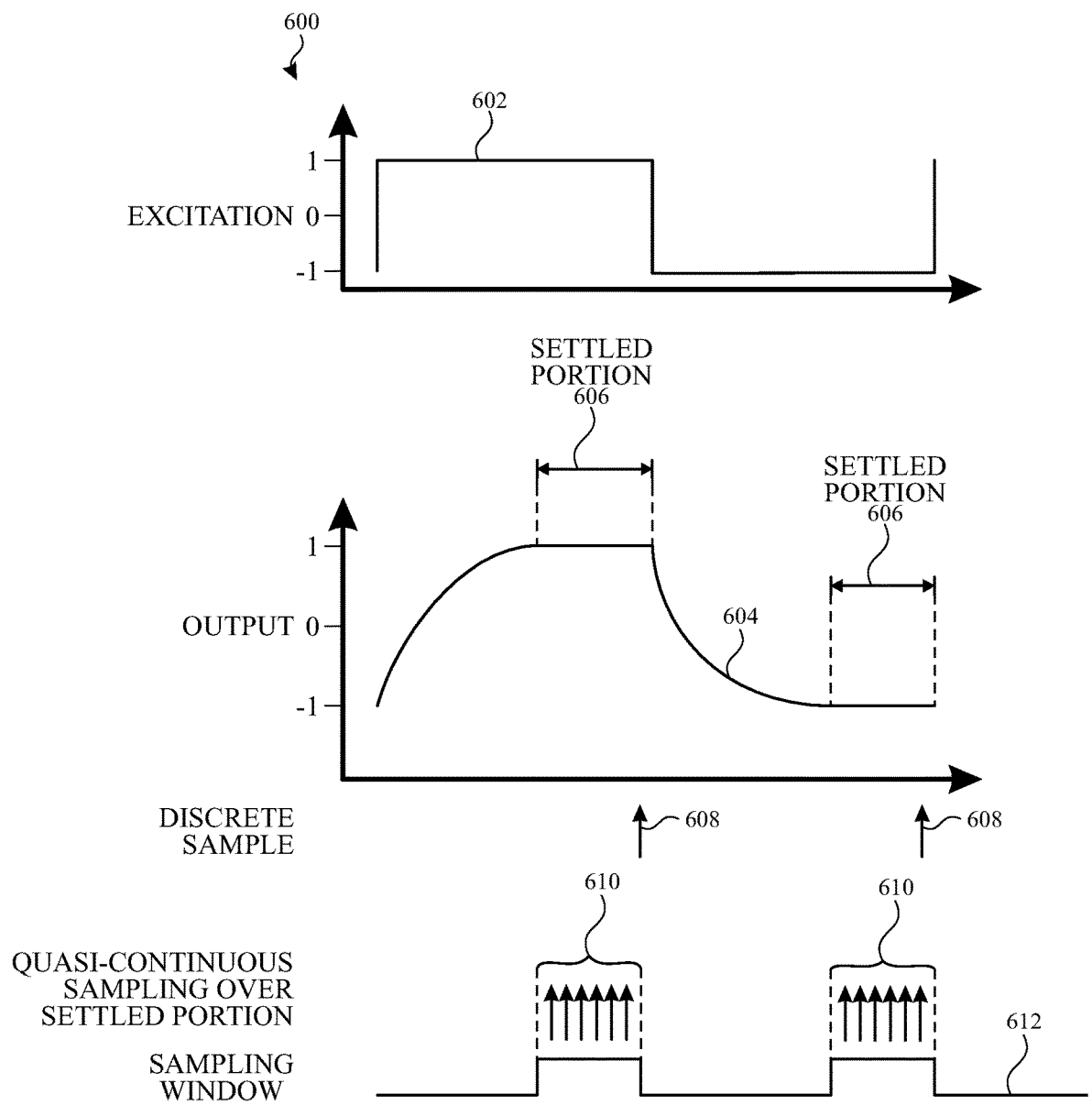
FIG. 6 illustrates an exemplary timing diagram for sampling a sensor output multiple times in a settled portion according to examples of the disclosure.

FIG. 6 illustrates an exemplary timing diagram for sampling a sensor output multiple times in a settled portion according to examples of the disclosure. The exemplary timing diagram 600 of FIG. 6 illustrates a period of excitation signal 602 and the corresponding response of sensor output signal 604, which can correspond to the waveforms of FIG. 4. The system can be perturbed by the rising or falling edges of the excitation signal 602, which can result in a transient, unsettled portion of output signal 604. After a settling time, however, the output signal 604 can be sampled during a settled portion 606 of the output signal. Unlike the discrete sampling of FIG. 4 (illustrated in FIG. 6 by samples 608 for comparison purposes), the sensor output signal 604 can be sampled a plurality of times or continuously during the settled portion 606 of output signal 604. The multiple sampling of sensor output 604 during the settled portions 606 is illustrated by multiple samples 610. It should be understood that even though FIG. 6 illustrates a single period of the excitation signal 602, output signal 604 and samples 610, the illustration can continue and repeat for additional periods.

As illustrated in FIG. 6, a sampling window (represented in FIG. 6 by sampling window signal 612) can be defined as the time period in which the multiple sampling of the sensor output (quasi-continuous sampling) can be performed during the settled portion of the output signal. The sampling window can be parameterized by parameter R ($0 \leq R \leq 1$), which can represent a ratio of the duration of the sampled portion of the waveform to the duration of the total waveform. For example, R=0.1 can correspond to sampling 10% of the total waveform, and R=0.5 can correspond to sampling 50% of the total waveform. Expressed another way, R can represent the ratio of the number of samples taken during the sampling window to the total number of samples possible for the period of the waveform (assuming the same sampling rate). R can be based, for example, on the settling time of the sensor output and/or the duration of the repeating portion of the excitation signal (e.g., the fundamental frequency of stimulation). A shorter repeating duration (e.g., higher fundamental frequency of stimulation) or a higher settling time can result in a smaller duration available for sampling (smaller R). A longer repeating duration (e.g., lower fundamental frequency of stimulation) or a lower settling time can result in a larger duration available for sampling (larger R).

In some examples, the sampling window can be selected to overlap with the entire settled portion of the sensor output. Increasing the duration of the window to the same duration as the settled portion can increase the number of samples available and thereby improve interference rejection without affecting a drift specification. In some examples, the sampling window can be shorter than the settled portion of the sensor output. For example, if one or more interference susceptibility thresholds are satisfied, the additional processing of more samples and power consumption of running an analog-to-digital converter (ADC) at a higher frequency to gather more samples can be unnecessary. Thus, a shorter sampling window can be employed (and, in some examples, a single discrete sample can be enough). Additionally, as described below, in some examples, the sampling window can be longer than the settled portion of the sensor output, so as to trade off interference susceptibility with drift requirements.

Figure 7:
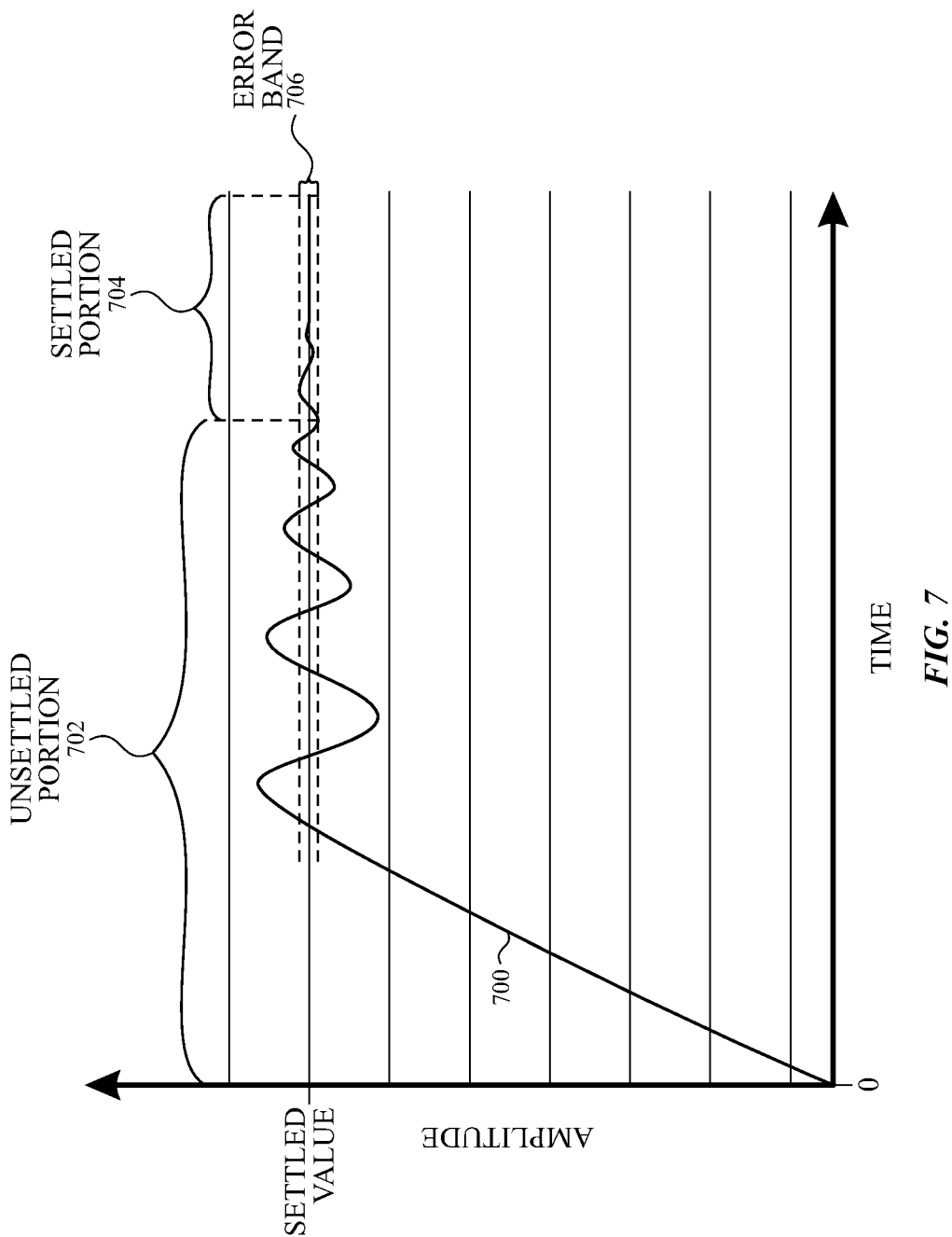
FIG. 7 illustrates an exemplary response waveform according to examples of the disclosure.

As discussed herein, the settled portion of the waveform can be defined for the touch sensing system. FIG. 7 illustrates an exemplary response waveform according to examples of the disclosure. The response signal 700 can correspond to the sensor output in response to a square wave input transitioning from low to high at t=0. The response signal 700 can include an unsettled portion 702 and a settled portion 704. During the unsettled portion 702, the response signal 700 can be affected by various perturbation and transient effects. In contrast, during the settled portion 704, the response signal 700 can be at the settled value within an error band 706. The error band ϵ bounding the settled portion 704 can be defined mathematically by the following expression: $|\epsilon| < V_{settled} \cdot \text{error \%}$, where $V_{settled}$ can be the settled value and error % can be the percentage error tolerance allowed for the system. The percentage error can be selected to meet the performance requirements for the systems (e.g., according to how much precision the system requires). In some examples, the percentage error can be between 0.01% and 1% error. In some examples, the percentage error can be between 0.1% and 0.5% error. In some examples, the percentage error can be 0.1%.

Figure 8A:
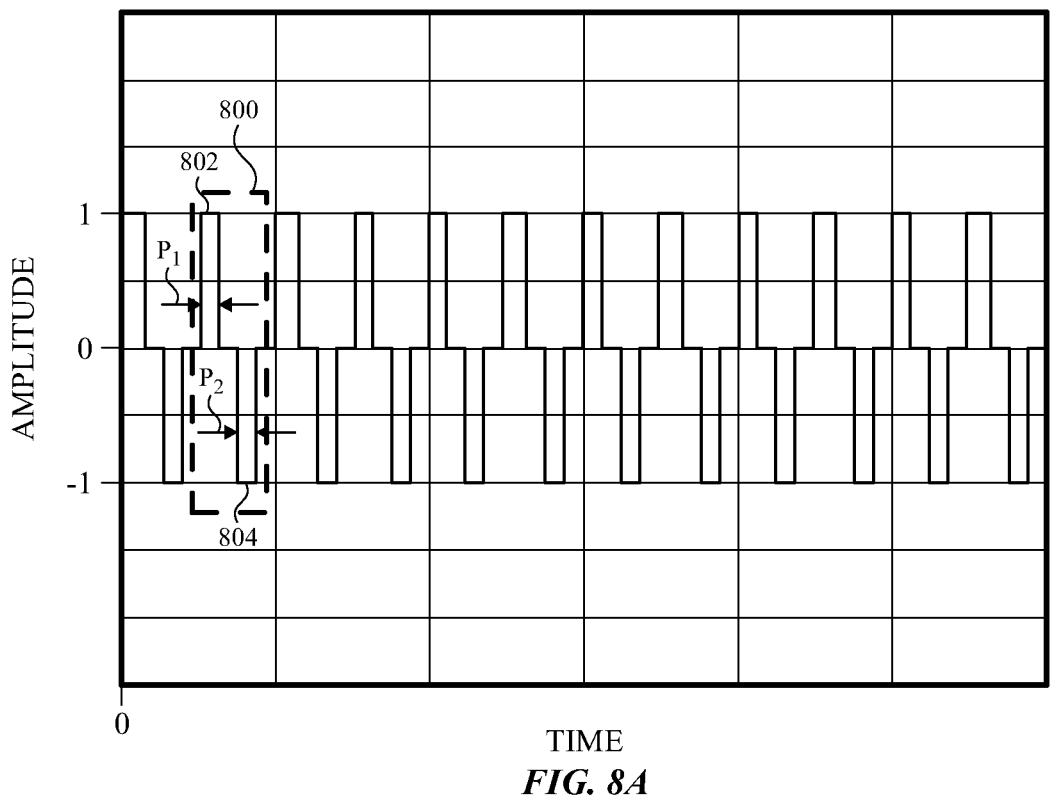
FIGS. 8A-8C illustrate exemplary time domain and frequency domain plots of quasi-continuous windowed output of a sensor according to examples of the disclosure.
Figure 8B:
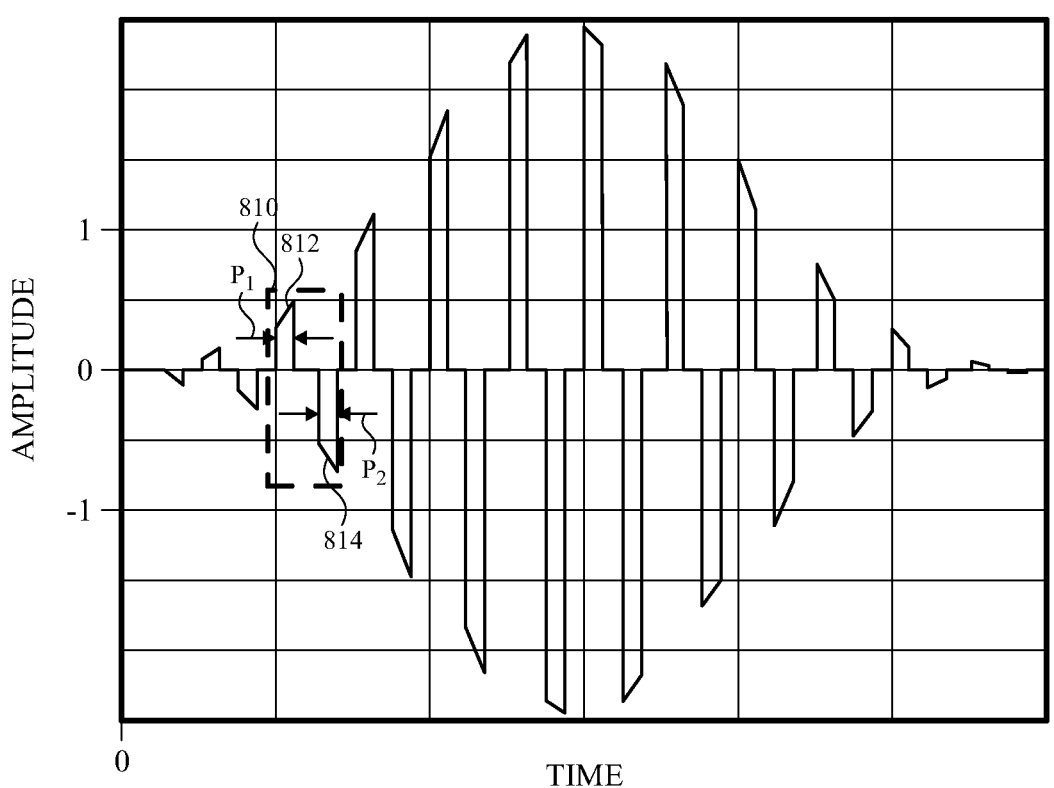
Figure 8C:
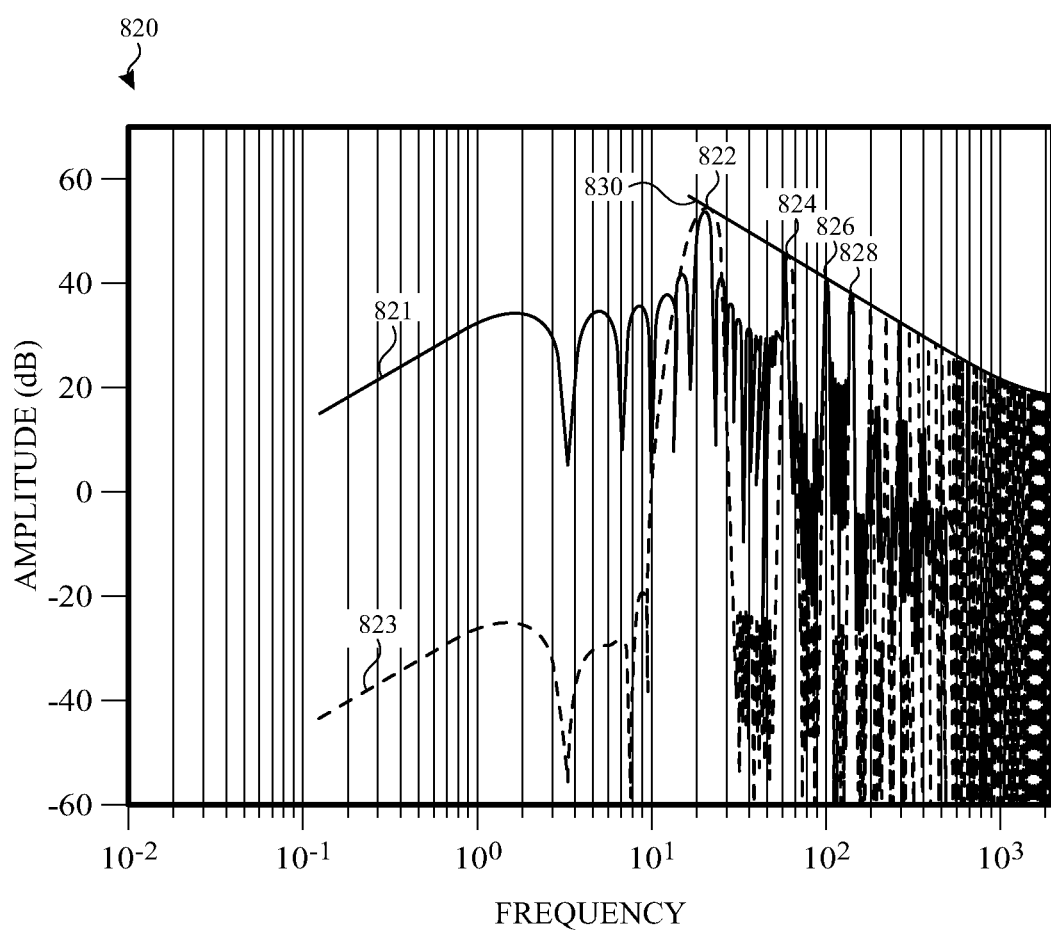

As discussed above, quasi-continuous sampling—sampling multiple times during a sampling window, rather than taking a discrete sample—can improve interference rejection (e.g., due to increased attenuation at higher frequencies). FIGS. 8A-8C illustrate exemplary time domain and frequency domain plots of quasi-continuous windowed output of a sensor according to examples of the disclosure. FIG. 8A illustrates an exemplary time domain plot of a quasi-continuous rectangular-windowed output of a sensor according to examples of the disclosure. The output of the sensor can be sampled twice for each period of the square wave excitation pulse. For example, the samples 802 and 804 in box 800 can correspond to multiple samples taken during sampling windows of durations P1 and P2 in response to one period of the excitation pulse. Sample 802 can correspond to multiple samples of the settled output taken corresponding on the high value of the excitation pulse during a sampling window of duration P1, and sample 804 can correspond to multiple samples of the settled output taken corresponding to the low value of the excitation pulse during a sampling window of duration P2. Due to the rectangular window (e.g., window function), the illustrated continuous samples can have the same weighting applied. Taken together, the windowed samples illustrated in FIG. 8A can be combined (or otherwise processed) to generate a capacitance measurement for the sensor.

FIG. 8B illustrates an exemplary time domain plot of a quasi-continuous Taylor-windowed output of a sensor according to examples of the disclosure. The output of the sensor can be sampled twice for each period of the square wave excitation pulse. For example, the samples 812 and 814 in box 810 can correspond to multiple samples taken during sampling windows of durations P1 and P2 in response to one period of the excitation pulse. Sample 812 can correspond to multiple samples of the settled output taken corresponding on the high value of the excitation pulse during a sampling window of duration P1, and sample 814 can correspond to multiple samples of the settled output taken corresponding to the low value of the excitation pulse during a sampling window of duration P2. Due to the Taylor window (e.g., window function), the illustrated quasi-continuous samples can have different weighting applied according to the Taylor window (for example, peaking in the center of the window and going to zero at the edges of the window). Taken together, the windowed samples illustrated in FIG. 8B can be combined (or otherwise processed) to generate a capacitance measurement for the sensor.

FIG. 8C illustrates an exemplary frequency domain plot corresponding to the time-domain processing described in FIGS. 8A and 8B according to examples of the disclosure. Plot 820 of FIG. 8C includes a fundamental peak 822 at the frequency of operation of the sensor, as well as peaks at the higher order harmonics of the fundamental frequency. For example, first harmonic peak 824, second harmonic peak 826 and third harmonic peak 828 can be at harmonics of the fundamental peak 822. As illustrated, the location of the peaks can be the same for both the frequency representation of the rectangular window 821 and the frequency representation of the Taylor window 823. The shaping of the Taylor window can reduce the amplitude of the frequency representation of the Taylor window 823 with respect to the frequency representation of the rectangular window 821 away from the fundamental frequency (and harmonics), in exchange for some widening of the peak at the fundamental frequency (and harmonics). As illustrated in FIG. 8C, although for a given operating frequency, the noise at harmonics of the fundamental frequency can still appear, the noise at harmonics (and frequencies higher than the fundamental frequency) can be attenuated considerably (10 dB or more as illustrated, for example). As curve 830 shows, noise from harmonics of the fundamental frequency (and other higher frequencies) can be increasingly suppressed, reducing the susceptibility to noise from internal and external interference.

It should be understood that although rectangular and Taylor windows are illustrated in FIGS. 8A-8C, other windows (window functions) can be applied to the sensor output samples. For example, triangular, Hamming, Hanning, Gaussian, Kaiser, etc. can be applied. The various windows can have different effects on amplitude, but they can share the improved harmonic interference rejection property of quasi-continuous sampling over applying the same window to a discrete sample. Additionally, it should be understood that non-linear processing (e.g., median, rank, polynomial filters, etc.), or adaptive processing can be used to process the multiple samples from the settled portion of the sensor output.

As the sampling window (or R) increases (and the number of samples collected during the settled portion increases) the performance of the touch sensing system can improve. For example, a touch sensing system selecting R=0.5 can better reject noise—including, for example, harmonic interference noise—than when R=0.1 is selected. Referring back to FIG. 8C, the slope of the linear portion of curve 830 can be larger as R increases and smaller as R decreases. Thus, selecting R can depend on the interference specification of the system (e.g., how much interference rejection is needed).

In some examples, the sampling window duration (parameterized by R) and the operating frequency can be selected based on a drift specification and/or an interference specification. As used herein, a drift specification or interference specification refers to device parameters to ensure the system meets one or more operating thresholds or criteria. For example, a drift specification can require the operating frequency to be below a threshold frequency (e.g., $f \leq f_{max}$) such that the sensor output can be sampled at least once per period after settling. Additionally, as discussed above, an interference specification can require the duration of the sampling window be above a threshold (e.g., $R \geq R_{threshold}$). In some examples, a range of frequencies and sampling window durations can satisfy the drift and interference specifications. A combination of operating frequency and R that satisfy both specifications, for example, can be selected to achieve the high-precision, stable sensor performance. It should be understood, that selecting an operating frequency (fundamental frequency) from a range of frequencies can also be framed as selecting an excitation signal having a repeating duration (or period) from a range of durations.

In some examples, quasi-continuous sampling over the settled portion can be static. For example, a touch sensing system can be designed to sample quasi-continuously during a predefined sampling window and at a predefined frequency, rather than gathering a discrete-time sample. For example, a frequency and R can be selected that meet the drift and interference specifications. In some examples, as discussed in more detail below, the operating frequency and/or R can be adjusted dynamically. Dynamic adjustment can enable the device to meet the drift and interference specifications if operating conditions change such that existing parameter selections no longer meet the specifications or if the drift and interference specifications themselves change based on the operating conditions or environment of the touch sensing system.

In some examples, the drift and/or interference specifications can change depending on various factors (or alternatively, a system can fail to meet the specifications due to changes in the operating environment or operating conditions). For example, the drift specification may change according to aging of the device or according to changes in operating temperature (e.g., drift in the sensor output can increase as the device ages and as operating temperature increases). The interference specification can change based on what interference sources are introduced into the operating environment. The drift and/or interference specification can depend on an operating mode of the device and/or the type of touch sensing scan to be performed (e.g., mutual capacitance, self-capacitance, coarse scan, fine scan, etc.) It should be understood that the above are presented by way of examples, and do not represent an exclusive list. The system can track these various conditions, for example, by including a temperature sensor (to detect temperature gradients) or performing a spectral analysis scan to understand the external noise environment in which the system can be operating.

In some examples, a touch sensing system operating at $f_{max}$ such that its drift specification is satisfied, can improve interference rejection performance (e.g., due to spectral analysis indicating a noisy environment) by lowering its frequency of operation so as to increase settling period available to sample. By increasing R, the number of samples taken during the settling period can be increased so as to improve the interference rejection to meet the requirements for a noisy environment.

FIG. 9 illustrates exemplary timing diagrams demonstrating a tradeoff between operating frequency (fundamental frequency) and a number of samples according to examples of the disclosure. As described above, in some examples, a system operating at $f_{max}$ can be sampled such that a settled value is discretely sampled. For example, square wave 900 corresponding to an excitation signal at frequency $f_{max}$ can generate a response illustrated in output signal 902, which can be sampled discretely as indicated by arrows 904 (e.g., just before the transition edge of square wave 900. When the excitation signal is reduced in frequency (e.g., to ½ $f_{max}$) as illustrated by square wave 900', the time available for sampling (and therefore the sampling window) can be increased such that multiple samples can be collected as illustrated by multiple arrows 906 corresponding to the settled portion of the output signal 902'.

In some examples, instead of lowering the frequency of operation, the touch sensing system can trade off some of the drift performance for interference rejection. Thus, instead of lowering the frequency of operation, the system can loosen the drift specification by increasing the acceptable error tolerance. For example, referring back to FIG. 7, increasing the error bands can increase the portion of the output considered to be settled, thereby trading off additional samples for drift performance.

Figure 10:
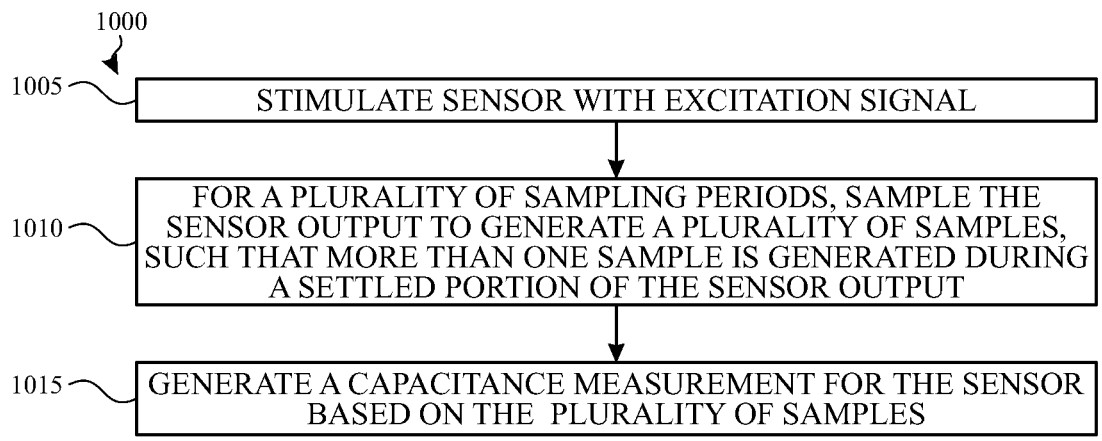
FIG. 10 illustrates an exemplary process for generating a capacitance measurement for a sensor according to examples of the disclosure.

As described above, in some examples, quasi-continuous sampling can be implemented in a static fashion. FIG. 10 illustrates an exemplary process 1000 for generating a capacitance measurement for a sensor according to examples of the disclosure. For a switched capacitor system, generating a capacitance measurement can include a plurality of measurement steps. For example, the sensor can be stimulated with a periodic excitation signal and the sensor can be sampled quasi-continuously during a sampling window for each period of the excitation signal. At 1005, the touch sensing system can stimulate the sensor with an excitation signal (e.g., a square wave). At 1010, the touch sensing system can quasi-continuously sample the output of the sensor. For a plurality of sampling periods, the sensor output can be sampled to generate a plurality of samples. During each sampling period (e.g., corresponding to the sampling window of FIG. 6) multiple samples can be taken, such that more than one sample can be generated during a settled portion of the sensor output (e.g., for each settled portion). At 1015, based on the plurality of samples, a capacitance measurement can be generated for the sensor.

Figure 11:
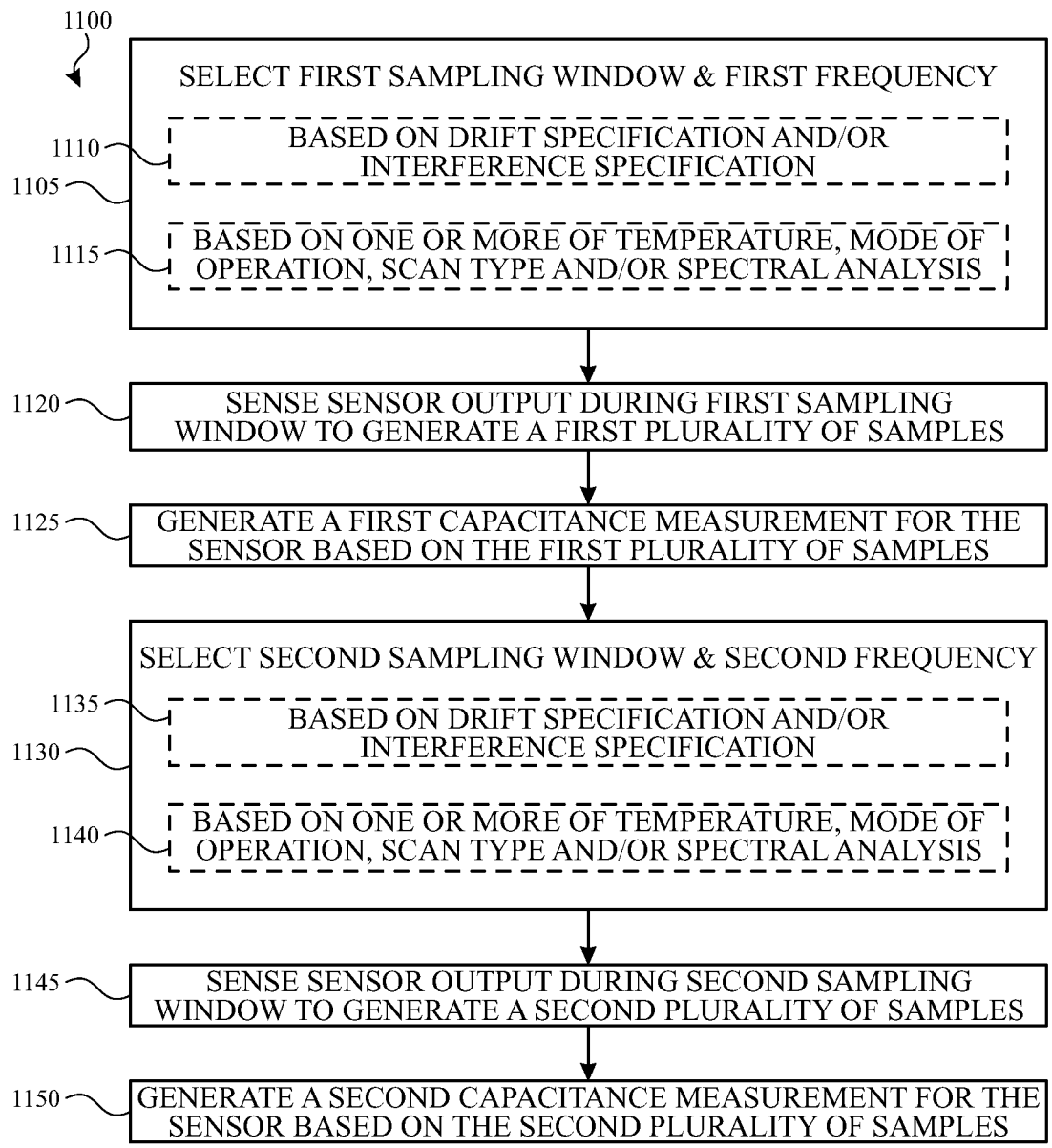
FIG. 11 illustrates another exemplary process for generating a capacitance measurement for a sensor according to examples of the disclosure.

As described above, in some examples, quasi-continuous sampling can be implemented in a dynamic fashion. The duration of the sampling window (parameterized by parameter R) or number of samples taken and/or the operating frequency (excitation signal repeating duration) can be adjusted based on the drift and interference requirements of the touch sensing system. FIG. 11 illustrates another exemplary process 1100 for generating a capacitance measurement for a sensor according to examples of the disclosure. For a switched capacitor system, generating a capacitance measurement can include a plurality of measurement steps. For example, the sensor can be stimulated with a periodic excitation signal and the sensor can be sampled quasi-continuously during a sampling window for each period of the excitation signal. The stimulation frequency (excitation signal repeating duration) and duration of the sampling window can be dynamically adjusted based on the drift and/or interference specifications. At 1105, a first sampling window and a first stimulation frequency can be selected. The parameters can be selected based on the drift specification and/or the interference specification (1105). For example, a sampling window and stimulation frequency can be selected from a range of parameters that meet the drift and interference specification for the touch sensing system. The drift an interference specifications can be based on operating conditions or operating environment of the touch sensing system (1110). For example, as discussed above, the drift and interference specifications can be adjusted based on one or more of temperature, mode of operation, scan type, and spectral analysis (1115). At 1120, the sensor output (e.g., in response to the excitation signal at the first frequency) can be sensed for each measurement step during the sampling window defined by the first sampling window to generate a first plurality of samples. As described above with reference to process 1000, multiple samples can be taken during the sampling window of each measurement step, such that more than one sample can be generated during a settled portion of the sensor output (e.g., for each settled portion). At 1125, based on the first plurality of samples, a first capacitance measurement can be generated for the sensor.

When operating or environmental conditions change, the sampling window and/or frequency parameters can be updated. At 1130, a second sampling window and a second stimulation frequency can be selected. The second sampling window and/or the second stimulation frequency can be different than the first sampling window and/or the first stimulation frequency. The parameters can be selected based on the touch sensing system's drift specification and/or the interference specification (1135), and the drift and interference specifications can be based on operating conditions or operating environment of the touch sensing system including one or more of temperature, mode of operation, scan type, and spectral analysis (1140). For example, a spectral analysis scan may indicate interference sources in the operating environment that can require a different interference specification to properly reject the interference. As another example, an increase in operating temperature can increase (e.g., detected by a temperature sensor) can increase drift in the sensor output At 1145, the sensor output (e.g., in response to the excitation signal at the second operating frequency) can be sensed for each measurement step during the sampling window defined by the second sampling window to generate a second plurality of samples. At 1150, based on the second plurality of samples, a second capacitance measurement can be generated for the sensor.

It should be understood that selection of the sampling window duration R and frequency (excitation signal repeating duration) can include selecting $f_{max}$ and a sampling window that can allow for a single discrete sample. Thus, the dynamic adjustment can allow the touch sensing system to switch between discrete sampling and quasi-continuous sampling depending on the operating conditions or environment of the touch sensing system.

Additionally or alternatively to quasi-continuous sampling, in some examples, performance of the touch sensing system can be improved by processing sensor output to reduce the effects of drift due to variations. A sensor response can be characterized under various conditions to develop a range of characterization curves. The characterization curves can be used to generate signal processing to equalize the output signal to account for the effects of drift. The equalizer can be implemented using hardware, software or a combination of the two.

Figure 12:
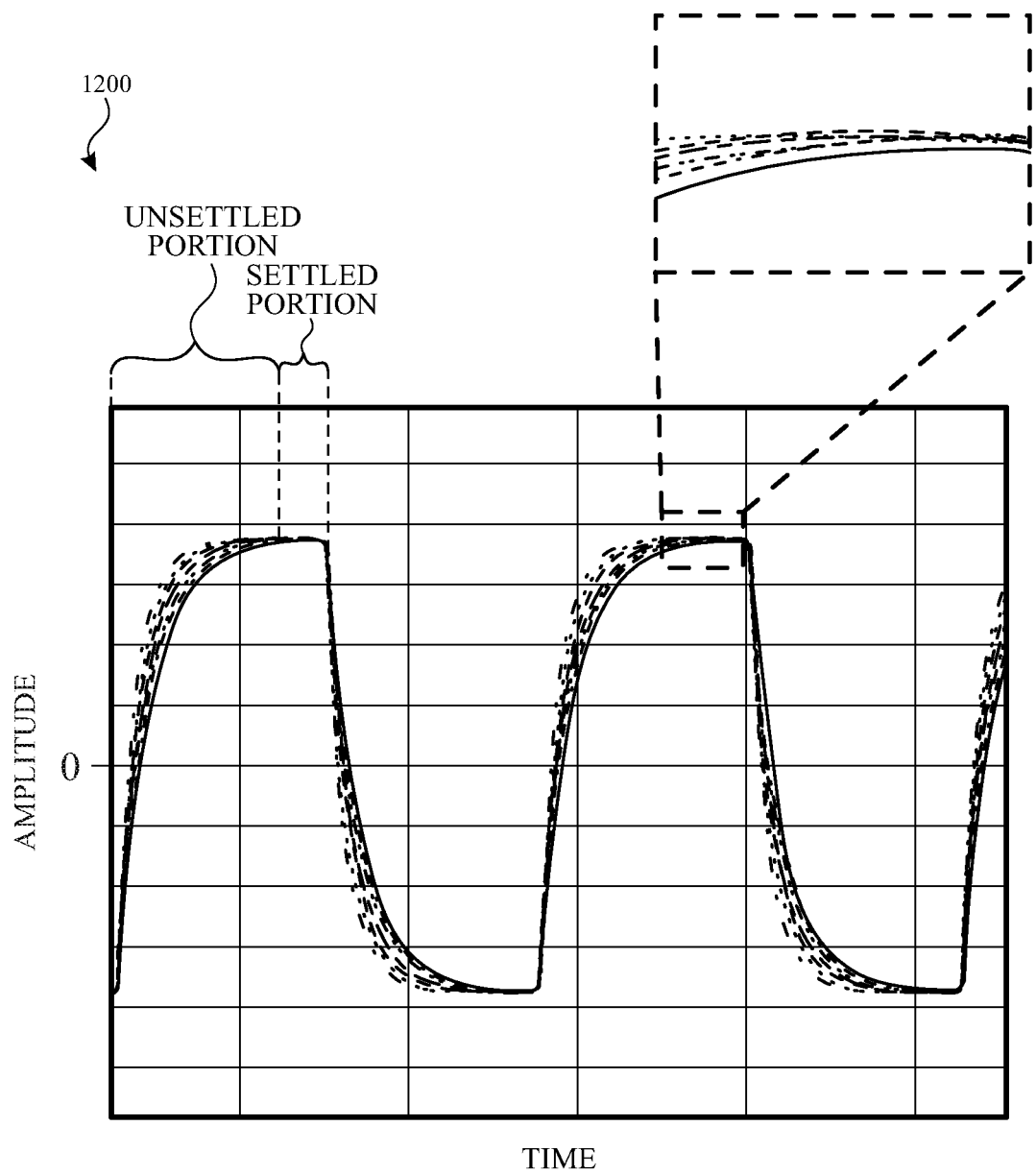
FIG. 12 illustrates exemplary characterization curves of a switched capacitor sensor according to examples of the disclosure.

Drift of the sensor output can occur due to temperature variation, process variation, and age of the sensor, for example. Drift in the sensor output can affect the precision of the sensor. FIG. 12 illustrates exemplary characterization curves of a switched capacitor sensor according to examples of the disclosure. Plot 1200 illustrates multiple characterization curves representing the output response to a square wave excitation signal under different conditions. For example, the curves can correspond to different temperatures, process variations, age of the sensor, etc. As illustrated in plot 1200, the separation between the curves, and thus the drift, can be smaller in the settled portion of the response than in the unsettled portions. Nonetheless, even within the settled portion of the waveform, the drift can be sufficient enough to impact the precision for small capacitance measurements.

Based on the response characterization curves, signal processing can be developed to transform the sensor output to reduce the separation between the curves during the settled portion of the sensor output, i.e., when the sensor output is sampled (one or more times). Thus, applying a transform to the output can reduce drift in capacitance measurements. Outside of the settled portion, the transform can increase, decrease or have no effect on the separation between the characterization curves. The transform can be a linear transform or non-linear transform.

Figure 13A:
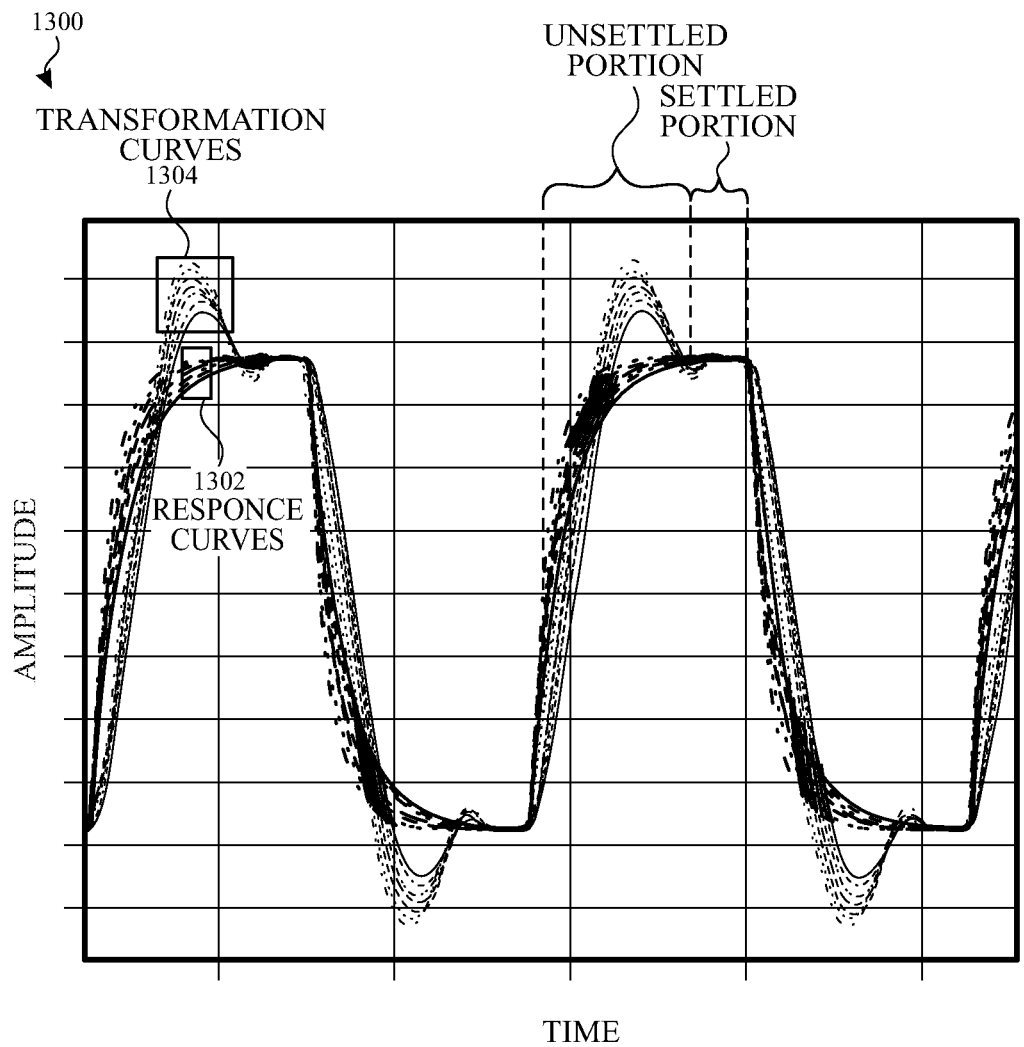
FIGS. 13A and 13B illustrate exemplary transformation curves according to examples of the disclosure.
Figure 13B:
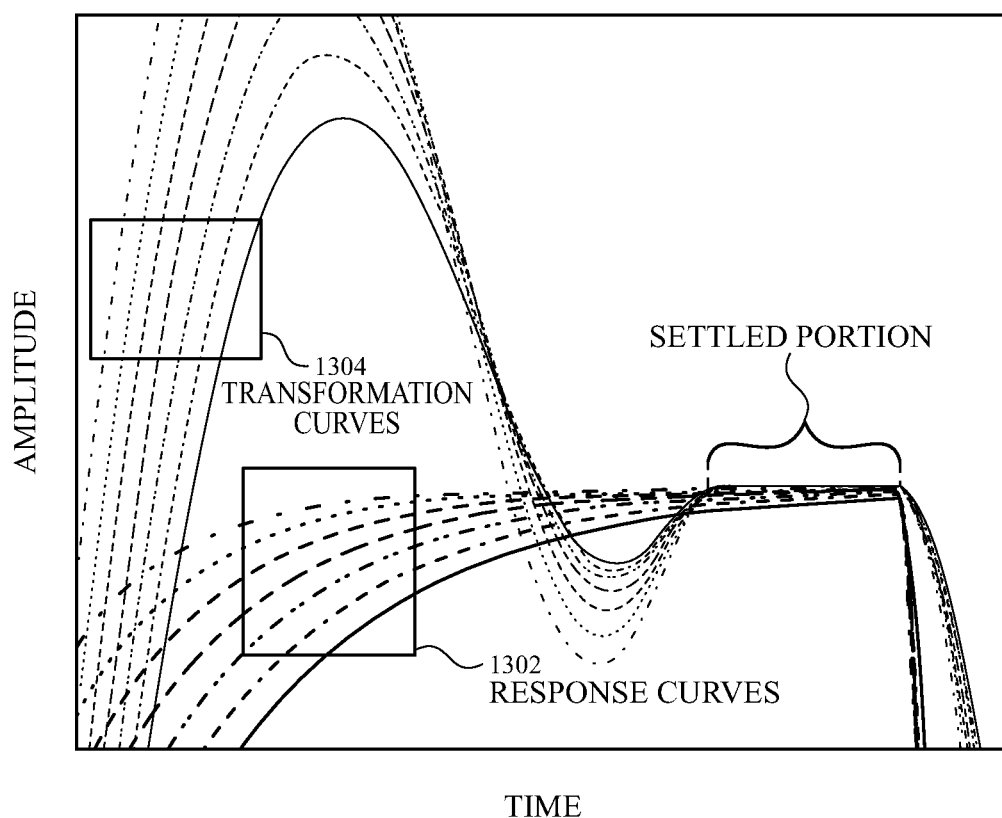

FIGS. 13A and 13B illustrate exemplary transformation curves according to examples of the disclosure. Plot 1300 illustrates multiple characterization curves or response curves 1302, which can correspond to the characterization curves of FIG. 12 for example. Plot 1300 also illustrates multiple transformation curves 1304 corresponding to the response curves 1302 after processing by an equalization transform. As illustrated, the transformation curves 1304 can exhibit larger separation outside of the settled portion than the response curves 1302, but within the settled portion, the separation between transformation curves 1304 can exhibit smaller separation than the response curves 1302. FIG. 13B illustrates a zoomed in view of FIG. 13A, which more clearly shows the reduced separation and therefore reduced drift of the transformation curves 1304 compared with the unprocessed response curves 1302 during the settled portion of the response.

Figure 14:
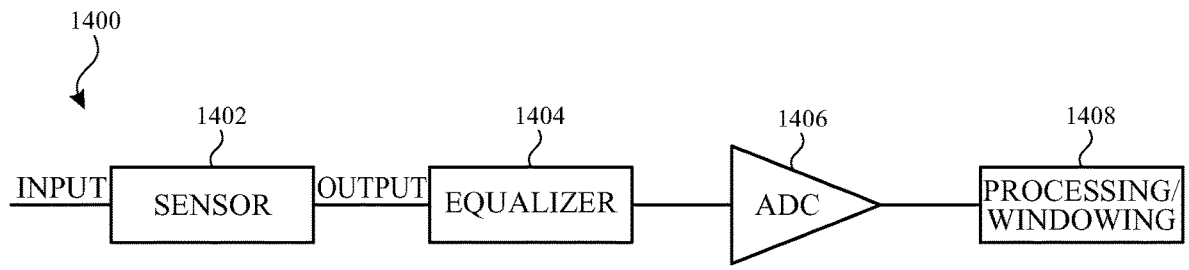
FIG. 14 illustrates an exemplary block diagram of a touch sensing system including an equalizer according to examples of the disclosure.

FIG. 14 illustrates an exemplary block diagram of a touch sensing system including an equalizer according to examples of the disclosure. Touch sensing system 1400 can include a switched capacitor sensor 1402 that can be stimulated, for example, by a square wave excitation signal. The output of sensor 1402 can be processed by equalizer 1404 to transform the output as described herein. During settled portions of the output, the transformed output can be sampled (one or more times) by ADC 1406. The samples can be further processed (e.g., scaled, filtered, etc.) and windowed (e.g., rectangular window, Taylor window, etc.) by processor 1408 to generate a capacitance sensor measurement. It should be understood that although equalizer 1404 is illustrated between the sensor 1402 and ADC 1406, in other examples the equalizer can be located in a different portion of the signal processing chain (e.g., after the ADC). Additionally, although equalization is described as implemented on the receiver end of the touch sensing system, in other examples, the equalization can be implemented on the transmitter side (or in both the transmitter side and receiver side). The transformation can be applied to the excitation signal to reduce variation in the response during the settled portion of the sensor output.

Figure 15:
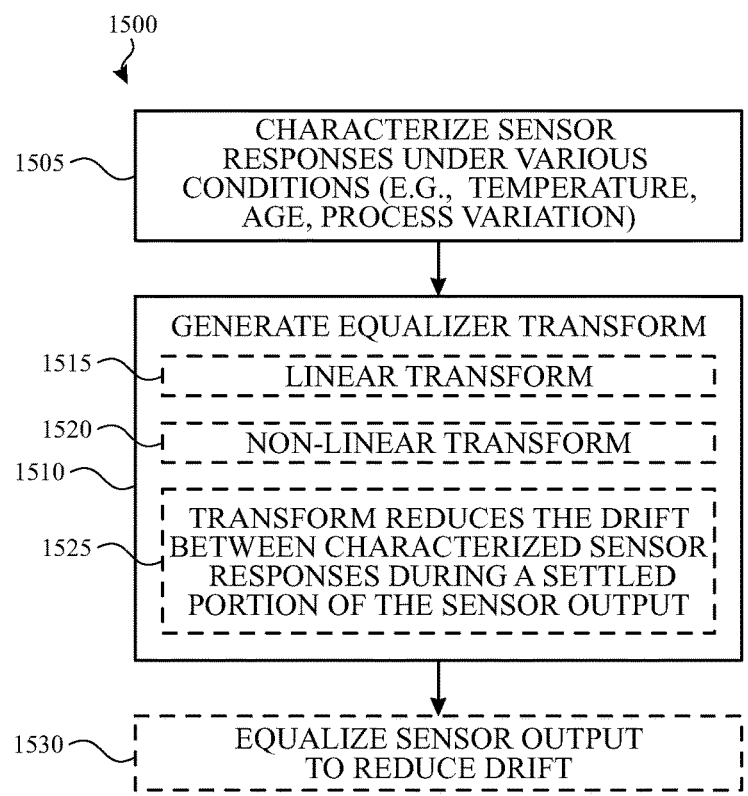
FIG. 15 illustrates an exemplary process for equalizing sensor output according to examples of the disclosure.

FIG. 15 illustrates an exemplary process 1500 for equalizing sensor output according to examples of the disclosure. At 1505, a range of sensor responses can characterize the sensor under various conditions including temperature variation, process variation, and age changes. The characterization of the sensor can be performed at calibration (during manufacture), for example. In other examples, the characterization can be updated dynamically (e.g., to include new characterization curves) when new responses are measured outside of the range of initial calibration characterization curves. This dynamic update can occur continuously, periodically, or due to some other condition or trigger. At 1510, an equalizer transform can be generated based on the characterization curves. The transform can be a linear (1515) or non-linear (1520) transform. The transform can reduce the drift between the characterized sensor responses during a settled portion of the sensor output compared with the un-equalized sensor output (1525). At 1530, the equalizer can apply the transform to the sensor output to reduce the drift of the sensor output during operation. The reduced drift can improve the performance of the touch sensing system by improving precision and stability of the sensor.

Additionally or alternatively, in some examples, the touch sensing system performance can be improved using a continuous sampling scheme and processing using a tailored (e.g., optimized) windowing function. The tailored windowing function can reduce effects of drift and interference to improve performance. Additionally, using a continuous sampling scheme can allow the touch sensing system to operate above the maximum allowed frequency ($f_{max}$) provided by discrete sampling and processing schemes for sensing systems (e.g., using switched capacitor circuits).

As discussed above, the response of a sensor (e.g., to a square wave excitation signal) can be characterized under various conditions to develop a range of characterization curves. However, rather than (or in addition to) generating an equalizer as described above, the various sensor responses can be used to generate a tailored (e.g., optimized) window for processing samples continuously sampled from the sensor output (e.g., at processor 1408). The tailored (e.g., optimized) window can provide stable output (within an error tolerance) across various operating conditions. In some examples, the tailored (e.g., optimized) windowing can be achieved using a linear processor, though in other examples non-linear processing can be used.

A linear processor designed based on the characterization curves can be described mathematically by the following optimization problem, for example. The optimization goal can be to minimize the energy in a window w, $\|w\|_2$, that can then be applied to continuous samples of the sensor. The optimization can be subject to the condition that $h_i^T w = 1 + \epsilon_i$, for $1 \leq i \leq L$ and $\|\epsilon_i\| \leq \epsilon_{threshold}$ for $1 \leq i \leq L$, where $h_i^T$ can represent the transposed characterized responses of the sensor (indexed by i), 1 can represent a normalized output value for the sensor, $\epsilon_i$ can represent the error tolerance for the system and L can be an integer number greater than 1. The window generated according to the above optimization problem can perform linear processing to normalize the sensor output across various conditions of the device. It should be understood that the above optimization of the window is but one solution to ensure uniform output from the sensor across various conditions, but that other processors (including non-linear processors) can be used as well to tailor the window.

Figure 16:
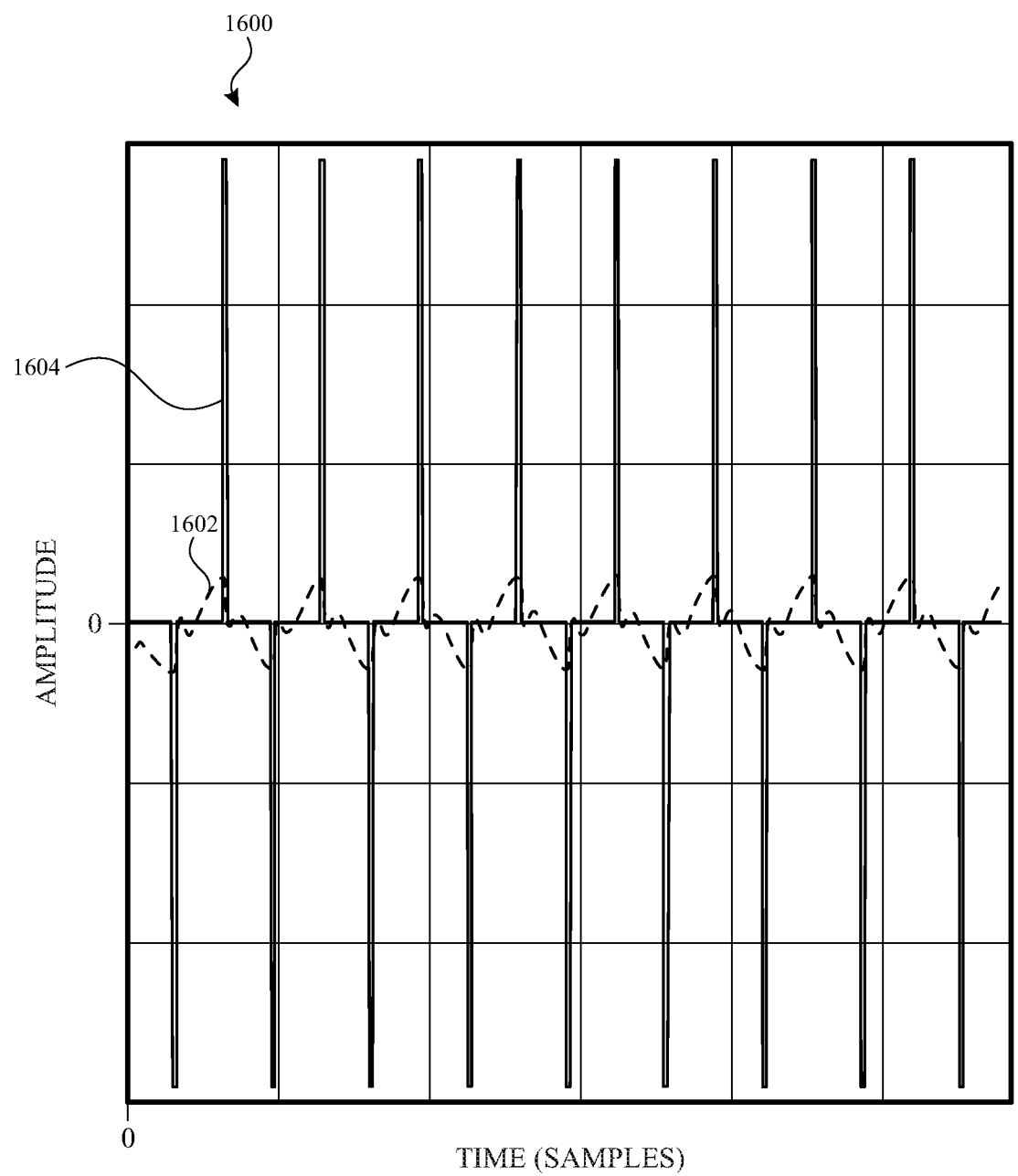
FIG. 16 illustrates an exemplary optimized window according to examples of the disclosure.

FIG. 16 illustrates an exemplary optimized (or otherwise tailored) window according to examples of the disclosure. Plot 1600 includes a representation of an optimized window 1602 for a continuous sampling system. For comparison, plot 1600 also includes a representation of a rectangular window 1604 for a discrete-time sampling scheme. As illustrated, optimized window 1602 can provide different weighting (or attribute different weight) to different samples taken continuously from the sensor output. In contrast, rectangular window 1604 can provide uniform weight to a discrete sample taken after the sensor output settles. It should be noted that weighting applied by optimized window 1602 to samples collected in the settled portion of the sensor output can be larger than the weighting applied by the optimized window to samples collected in the unsettled portion of the sensor output. For example, optimized window 1602 in FIG. 16 can apply maximum weighting where optimized window 1602 overlaps with rectangular window 1604. Adjusting the weighting applied to various samples can generate a drift invariant output (within tolerances). It should be understood that the optimized window illustrated in FIG. 16 is exemplary and other weightings are possible.

Figure 17:
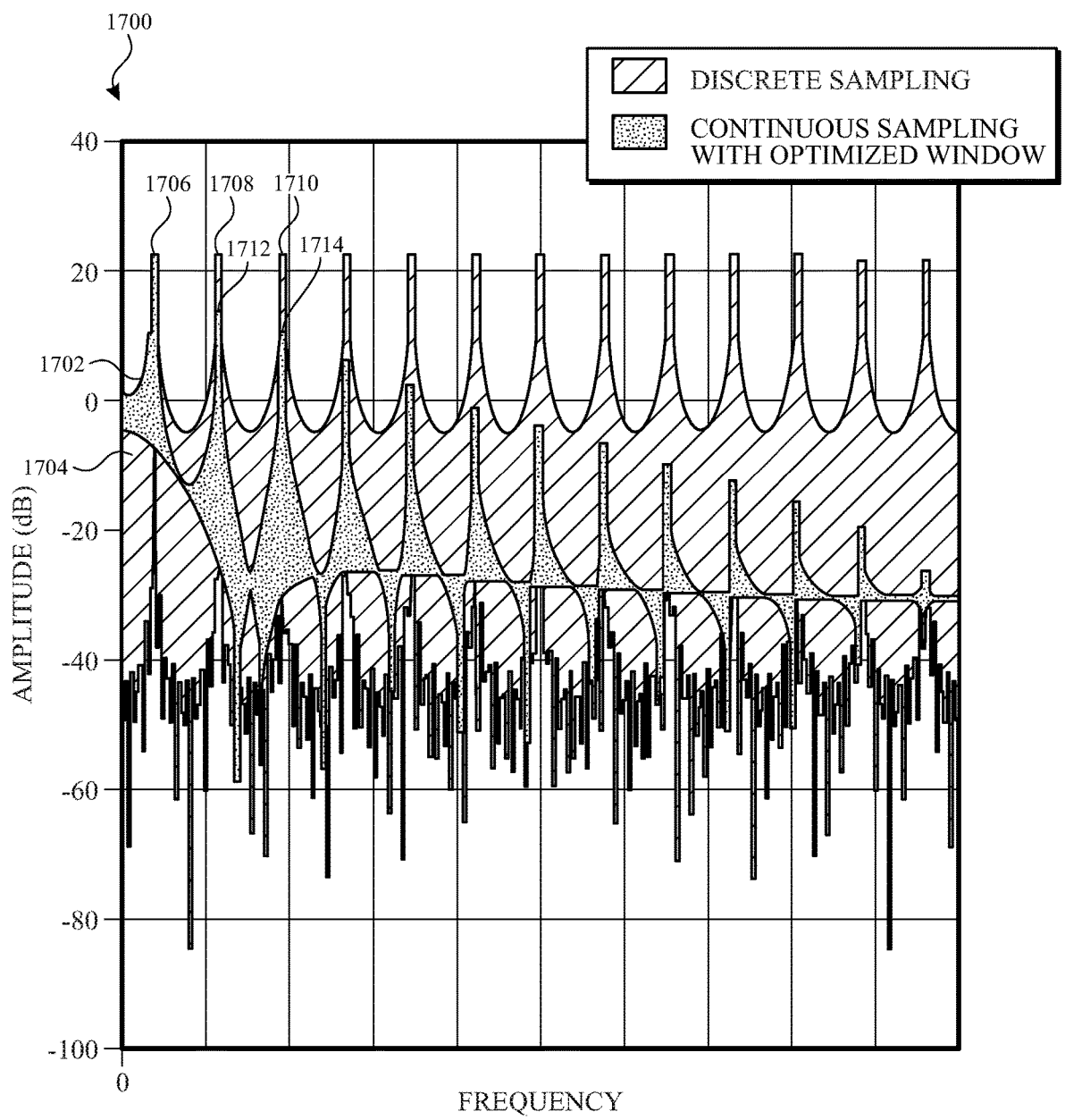
FIG. 17 illustrates an exemplary frequency domain representation of an optimized window according to examples of the disclosure.

In addition to drift invariance, the continuous sampling can also provide interference rejection as described above with respect to quasi-continuous sampling. FIG. 17 illustrates an exemplary frequency domain representation of an optimized window according to examples of the disclosure. Plot 1700 of FIG. 17 includes a frequency domain representation of optimized window 1702 and a frequency domain representation of rectangular window 1704. As described and illustrated with respect to FIGS. 5C and 8C, windowing the discrete and continuous samples can result in a common fundamental peak 1706 at the frequency of operation of the sensor. Higher order harmonics of the fundamental frequency, however, can be attenuated when continuous samples are taken. For example, first harmonic peak 1708 of the rectangular window can pass more interference than first harmonic peak 1712 of the optimized window. Likewise, second harmonic peak 1710 of the rectangular window can pass more interference than second harmonic peak 1714 of the optimized window. Thus, as illustrated in FIG. 17, continuous sampling can reduce the amplitude of signal passed at higher order harmonics, so that the system can be less susceptible to noise from internal and external interference.

Figure 18:
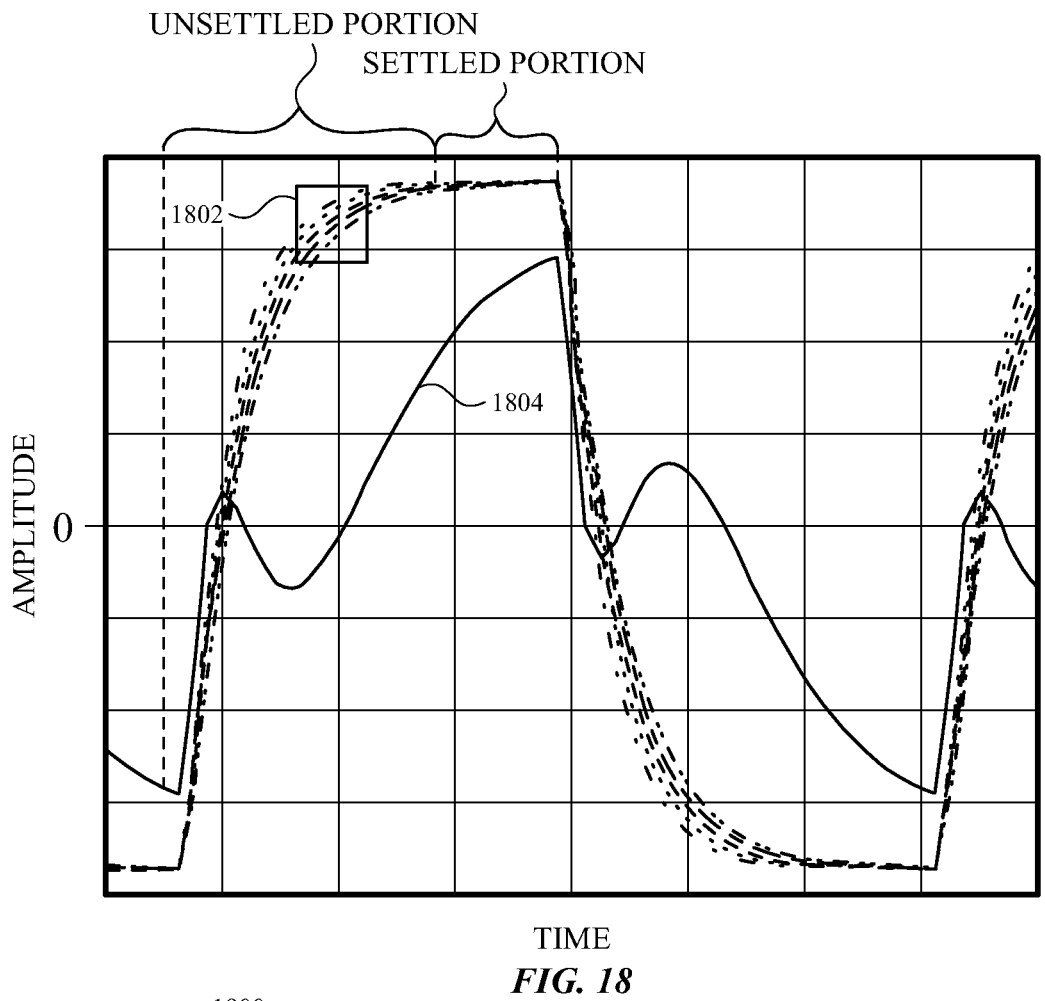
FIG. 18 illustrates an exemplary optimized windowing function for a range of characterization curves according to examples of the disclosure.

As discussed above, the optimized (or otherwise tailored) window can continuously sample the sensor output and achieve specified drift invariance based on weightings applied to the samples collected from the sensor output. FIG. 18 illustrates an exemplary optimized windowing function for a range of characterization curves according to examples of the disclosure. As illustrated in FIG. 18, response characterization curves 1802 can provide a range of responses for a sensor in response to a square wave excitation signal. Optimized window 1804 can represent weightings applied to samples taken at corresponding points of the sensor output. For example, weighting applied to samples taken during the settled portion of the sensor output can be higher compared with weightings corresponding to various parts of the unsettled portion. In some examples, the optimized window can have small or zero weighting for some samples (e.g., for sampling with high variation or drift in the output) and larger weightings can be applied when the variation in the output is smaller. When a sample weighting is zero, it is also possible to also not take a sample at that time (possibly saving processing power and reducing power consumption by the sampling ADC), because the sample can be discarded or ignored.

Although described as continuous sampling, it should be understood that the benefits of optimized windowing can be achieved with less than continuous sampling. For example, multiple discrete samples may be collected from both the settled and unsettled portions of the sensor output, without continuously sampling the entire sensor output. Additionally, although described as optimizing the window, in some examples, the optimization processing can be applied to the transmit side (e.g., the excitation signal) so as normalize the output across different variations. In some examples, processing can be applied to both the transmit and receive side (e.g., to the excitation signal and the window). For example, to avoid linearity issues of the analog front end of the receive channel in response to a square wave input, the transmit side waveform can be adjusted (e.g., to a triangle wave) and/or the window can be adjusted to zero out portions of the sensor output impacted by non-linearity of the analog front end.

Continuous sampling can provide for higher operating frequencies for the sensor over discrete or quasi-continuous sampling systems. As discussed herein, a discrete time system can have an $f_{max}$ defined to enable collection of discrete (or quasi-continuous) samples during the settled portion of the waveform. Because a continuous sampling scheme using an optimized window can collect samples outside of the settled period, it can be possible to operate the sensor using the optimized window beyond $f_{max}$ of a discrete system. Operating at higher frequencies can provide further bandwidth to operate the sensor to avoid known interferers or to reduce noise from interferers.

Figure 19:
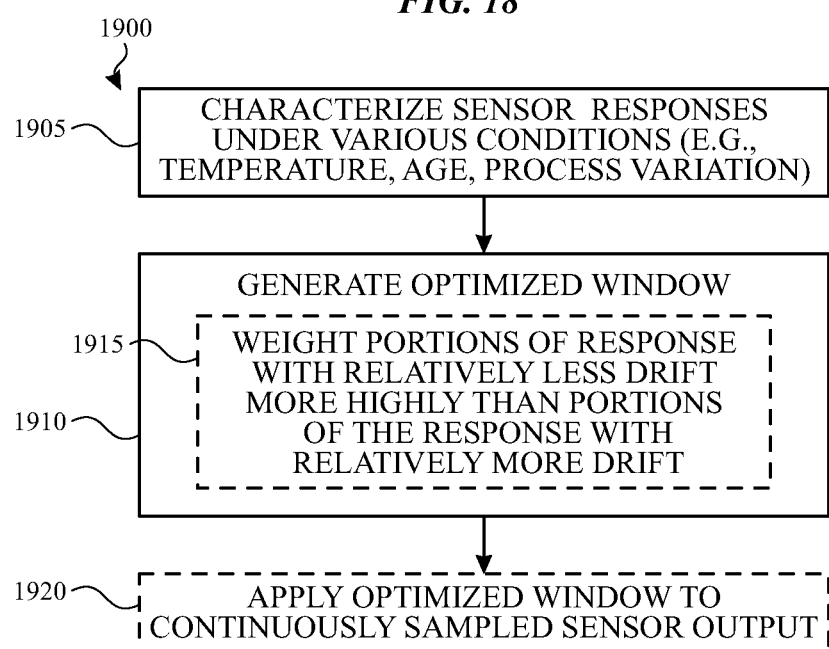
FIG. 19 illustrates an exemplary process for window optimization according to examples of the disclosure.

FIG. 19 illustrates an exemplary process 1900 for window optimization (or window tailoring generally) according to examples of the disclosure. At 1905, a range of sensor responses can characterize the sensor under various conditions including temperature variation, process variation, and age changes. The characterization of the sensor can be performed at calibration during manufacture, for example. In other examples, the characterization can be updated dynamically (e.g., to include new characterization curves) when new responses are measured outside of the range of initial calibration characterization curves. This dynamic update can occur continuously, periodically, or due to some other condition or trigger. At 1910, an optimized window can be generated based on the characterization curves (or dynamically based on the added new characterization curves). The optimized window can weight samples of the sensor output with relatively small drift between characterization curves with larger weights than applied to samples of the sensor output with relatively small drifts (1915). Likewise, the optimized window can weight samples of the sensor output with relatively large drift between characterization curves with smaller weights than applied to samples of the sensor output with relatively large drifts. In some examples, weights can be zero (and samples can be ignored or not taken). The optimized window can reduce the drift in the sensor output by reducing weight of samples with high drift. At 1920, the optimized window can be applied to continuously sampled sensor output to generate capacitance measurements than can be drift invariant and less susceptible to noise. Reduced drift and robust interference rejection can improve the performance of the touch sensing system by improving precision and stability of the sensor.

Figure 20:
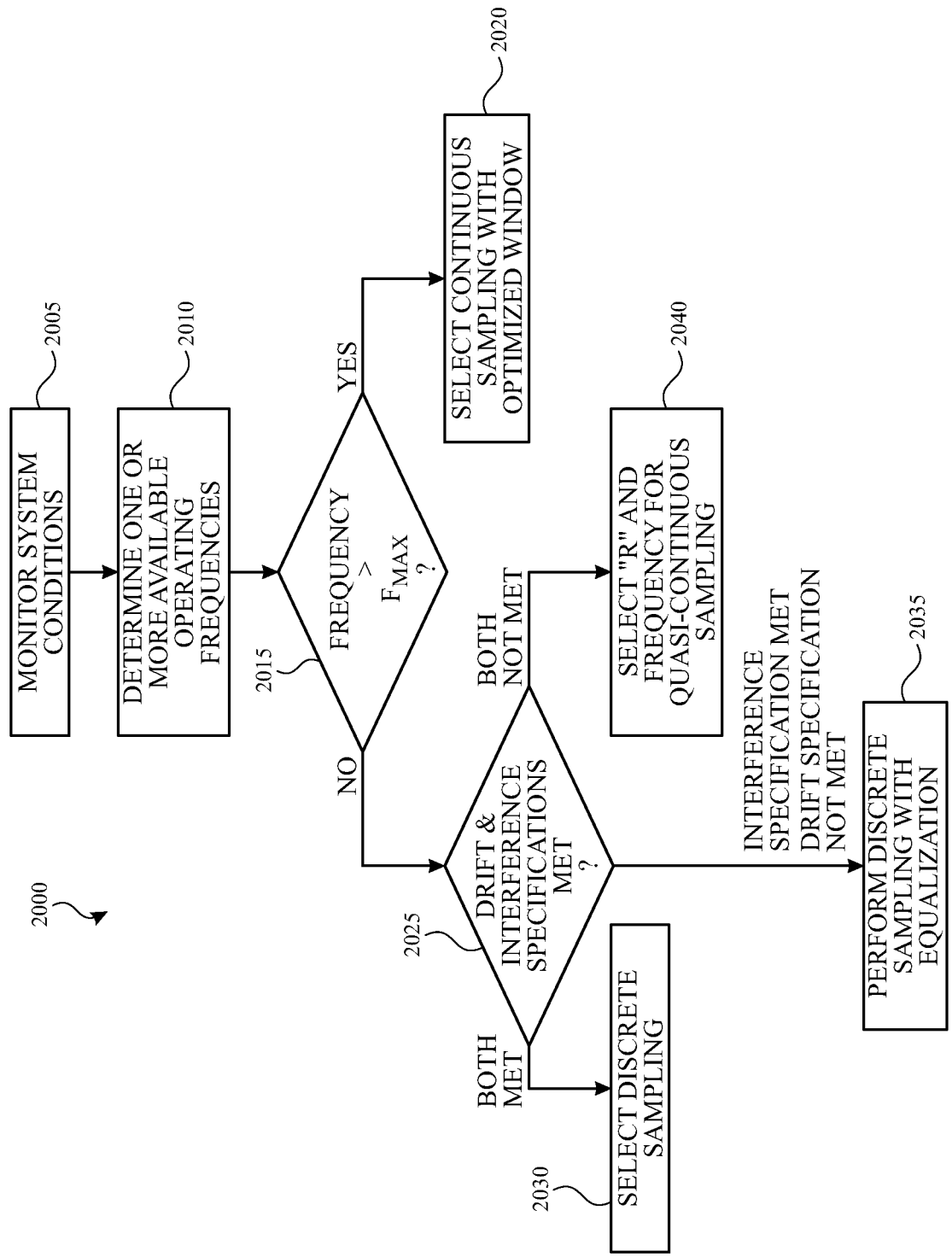
FIG. 20 illustrates an exemplary process for dynamically changing sampling and/or processing of the touch sensing system according to examples of the disclosure.

In some examples, the sampling and/or processing of the touch sensing system can dynamically change according to operating conditions. For example, the system can switch between different sampling schemes including one or more of discrete time sampling system, quasi-continuous time sampling, and continuous time sampling. Additionally or alternatively, the system can perform or not perform equalization or window optimization. FIG. 20 illustrates an exemplary process 2000 for dynamically changing sampling and/or processing of the touch sensing system according to examples of the disclosure. At 2005, the touch sensing system conditions can be monitored, and at 2010, available operating frequencies can be determined. At 2015, the touch sensing system can determine whether the available operating frequencies exceed $f_{max}$ for a discrete time sampling system. When the operating frequency exceeds $f_{max}$, the touch sensing system can select a continuous sampling scheme with an optimized window for generating capacitance measurements (2020). When the operating frequency is less than $f_{max}$, the system can determine at 2025 whether the drift and/or interference specifications can be met for the touch sensing system at the frequency of operation. If both the drift and interference specifications are met, the touch sensing system can select a discrete time sampling scheme for generating capacitance measurements (2030). If the drift specification is not met, but the interference specification is met, the touch sensing system can select a discrete time sampling scheme and use equalization processing for generating capacitance measurements (2035). If both the drift and interference specifications are not met, the touch sensing system can select an R and a frequency for a quasi-continuous time sampling scheme for generating capacitance measurements (2040).

It should be understood that the process 2000 of FIG. 20 is only exemplary and represent only one possible process for selecting the sampling type and processing for generating capacitance measurements from a switched capacitor touch sensing system. For example, a dynamic adjustment by way of an alternative process can be used to allow the touch sensing system to switch between discrete sampling and quasi-continuous sampling depending on the operating conditions or environment of the touch sensing system. In such an alternative process, the touch sensing system conditions can be monitored at 2005, and at 2025, the system can determine whether the drift and/or interference specifications can be met for the touch sensing system at a desired frequency of operation using discrete sampling. If both the drift and interference specifications are met, the touch sensing system can use the desired frequency of operation and discrete sampling (2030). Using discrete sampling can reduce processing complexity and power consumption (e.g., by the ADC) when unnecessary to satisfy the drift and interference requirements. If the drift specification is met, but the interference specification is not met, or if both the drift specification and interference specifications are not met, the sampling window (or R) can be dynamically updated and the system can quasi-continuously sample the sensor output (2040). Thus, in the alternate process, the touch sensing system can be simplified compared to process 2000 in that 2010, 2015, 2020 and 2035 can be omitted. In some examples, the frequency can be dynamically updated along with the sampling window such that the settled portion of the output sufficient duration to accommodate the sampling window. For example the frequency can be lowered to increase the duration of the settled portion of the output to be the same as the sampling window duration. In some examples, drift can be traded off to accommodate the sampling window to improve the interference specification. For example, the error band in FIG. 7 can be relaxed, such that the settled portion of the output can be effectively increased in duration. In some examples, the touch sensing system can trade off drift performance only when there is sufficient margin above the minimum drift requirements. In some examples, the touch sensing system can trade off drift performance, even if the drift specification is no longer met, under specific conditions (e.g., when operating in a noisy environment or when performing a scan type (e.g., a coarse touch detection scan) that does not require meeting the drift specification.)

Therefore, according to the above, some examples of the disclosure are directed to a method. The method can comprise: selecting a first excitation signal and a first sampling window; stimulating a sensor with the first excitation signal; sampling the sensor a plurality of times during the first sampling window to generate a first plurality of samples; and generating a first capacitance measurement for the sensor based on the first plurality of samples. Additionally or alternatively to one or more of the examples disclosed above, in some examples, the method can further comprise selecting a second excitation signal and a second sampling window; stimulating the sensor with the second excitation signal; sampling the sensor a plurality of times during the second sampling window to generate a second plurality of samples; and generating a second capacitance measurement for the sensor based on the second plurality of samples. At least one of the second excitation signal and the second sampling window can be different than the first excitation signal and the first sampling window. Additionally or alternatively to one or more of the examples disclosed above, in some examples, the first plurality of samples can include a different number of samples than the second plurality of samples. Additionally or alternatively to one or more of the examples disclosed above, in some examples, the first excitation signal and the second excitation signal can have the same fundamental frequencies. Additionally or alternatively to one or more of the examples disclosed above, in some examples, the first excitation signal and the second excitation signal can have different fundamental frequencies. Additionally or alternatively to one or more of the examples disclosed above, in some examples, generating the first capacitance measurement for the sensor based on the first plurality of samples can comprise windowing the first plurality of samples with a window function. Additionally or alternatively to one or more of the examples disclosed above, in some examples, the excitation signal can have a trapezoidal waveform. Additionally or alternatively to one or more of the examples disclosed above, in some examples, the first sampling window and the first excitation signal can be selected based on at least one of a drift specification and an interference specification. Additionally or alternatively to one or more of the examples disclosed above, in some examples, the second sampling window and the second excitation signal can be selected based on at least one of a drift specification and an interference specification. Additionally or alternatively to one or more of the examples disclosed above, in some examples, the first sampling window and the first excitation signal can be selected based on at least one of a temperature variation, a mode of operation, an interference profile and a scan type. Additionally or alternatively to one or more of the examples disclosed above, in some examples, the second sampling window and the second excitation signal can be selected based on at least one of a temperature variation, a mode of operation, an interference profile and a scan type. Some examples of the disclosure are directed to a non-transitory computer readable storage medium storing one or more programs, the one or more programs comprising instructions, which when executed by a device including one or more processors, causes the device to perform a method according to any of the above methods.

Some examples of the disclosure are directed to an apparatus. The apparatus can comprise a sensor and one or more processors coupled to the sensor. The one or more processors can be capable of: selecting a first excitation signal and a first sampling window; stimulating the sensor with the first excitation signal; sampling the sensor a plurality of times during the first sampling window to generate a first plurality of samples; and generating a first capacitance measurement for the sensor based on the first plurality of samples. Additionally or alternatively to one or more of the examples disclosed above, in some examples, the one or more processors can further be capable of selecting a second excitation signal and a second sampling window; stimulating the sensor with the second excitation signal; sampling the sensor a plurality of times during the second sampling window to generate a second plurality of samples; and generating a second capacitance measurement for the sensor based on the second plurality of samples. At least one of the second excitation signal and the second sampling window can be different than the first excitation signal and the first sampling window. Additionally or alternatively to one or more of the examples disclosed above, in some examples, the first plurality of samples can include a different number of samples than the second plurality of samples. Additionally or alternatively to one or more of the examples disclosed above, in some examples, the first excitation signal and the second excitation signal can have the same fundamental frequencies. Additionally or alternatively to one or more of the examples disclosed above, in some examples, the first excitation signal and the second excitation signal can have different fundamental frequencies. Additionally or alternatively to one or more of the examples disclosed above, in some examples, generating the first capacitance measurement for the sensor based on the first plurality of samples can comprise windowing the first plurality of samples with a window function. Additionally or alternatively to one or more of the examples disclosed above, in some examples, the excitation signal can have a trapezoidal waveform. Additionally or alternatively to one or more of the examples disclosed above, in some examples, the first sampling window and the first excitation signal can be selected based on at least one of a drift specification and an interference specification. Additionally or alternatively to one or more of the examples disclosed above, in some examples, the second sampling window and the second excitation signal can be selected based on at least one of a drift specification and an interference specification. Additionally or alternatively to one or more of the examples disclosed above, in some examples, the first sampling window and the first excitation signal can be selected based on at least one of a temperature variation, a mode of operation, an interference profile and a scan type. Additionally or alternatively to one or more of the examples disclosed above, in some examples, the second sampling window and the second excitation signal can be selected based on at least one of a temperature variation, a mode of operation, an interference profile and a scan type.

Some examples of the disclosure are directed to a method. The method can comprise: stimulating the sensor with an excitation signal; sampling an output of the sensor multiple times during a plurality of sampling periods to generate a plurality of samples; and generating a measurement for the sensor based on the plurality of samples. More than one sample of the plurality of samples can be generated during a settled portion of the output. Some examples of the disclosure are directed to a non-transitory computer readable storage medium storing one or more programs, the one or more programs comprising instructions, which when executed by a device including one or more processors, causes the device to perform a method according to any of the above methods.

Some examples of the disclosure are directed to an apparatus. The apparatus can comprise a sensor and processing circuitry coupled to the sensor. The processing circuitry can be capable of: stimulating the sensor with an excitation signal; sampling an output of the sensor multiple times during a plurality of sampling periods to generate a plurality of samples; and generating a measurement for the sensor based on the plurality of samples. More than one sample of the plurality of samples can be generated during a settled portion of the output.

Some examples of the disclosure are directed to a touch sensing system. The touch sensing system can comprise a touch sensor and a processor coupled to the touch sensor. The processor can be capable of: monitoring operating conditions of the touch sensing system; dynamically selecting, based on the operating conditions, a sampling mode from one of a discrete sampling mode and a quasi-continuous sampling mode; and sampling an output of the touch sensor according to the selected sampling mode. Additionally or alternatively to one or more of the examples disclosed above, in some examples, the processor can be further capable of selecting a sampling window for the quasi-continuous sampling mode. Additionally or alternatively to one or more of the examples disclosed above, in some examples, the processor can be further capable of selecting a new excitation signal when switching between the discrete sampling mode and quasi-continuous sampling mode.

Some examples of the disclosure are directed to a method. The method can comprise: dynamically selecting, based on the operating conditions, a sampling mode from one of a discrete sampling mode and a quasi-continuous sampling mode; and sampling an output of the touch sensor according to the selected sampling mode. Additionally or alternatively to one or more of the examples disclosed above, in some examples, the method can further comprise selecting a sampling window for the quasi-continuous sampling mode. Additionally or alternatively to one or more of the examples disclosed above, in some examples, the method can further comprise selecting a new excitation signal when switching between the discrete sampling mode and quasi-continuous sampling mode. Some examples of the disclosure are directed to a non-transitory computer readable storage medium storing one or more programs, the one or more programs comprising instructions, which when executed by a device including one or more processors and a touch sensor, causes the device to perform a method according to any of the above methods.

Some examples of the disclosure are directed to an apparatus. The apparatus can comprise a sensor and a receiver channel coupled to an output of the sensor. The receiver channel can comprise an equalizer configured to transform the output of the sensor to reduce drift at the output of the sensor. Additionally or alternatively to one or more of the examples disclosed above, in some examples, the transform can be a linear transform. Additionally or alternatively to one or more of the examples disclosed above, in some examples, the transform can be a non-linear transform. Additionally or alternatively to one or more of the examples disclosed above, in some examples, the transform can reduce drift at the output of the sensor during a settled portion of the output.

Some examples of the disclosure are directed to a method. The method can comprise characterizing a sensor response under multiple operating conditions and generating, based on the characterization of the sensor response, an equalizer transform. The transform can reduce drift in the output of the sensor during a settled portion of the output. Additionally or alternatively to one or more of the examples disclosed above, in some examples, the transform can be a linear transform. Additionally or alternatively to one or more of the examples disclosed above, in some examples, the transform can be a non-linear transform. Additionally or alternatively to one or more of the examples disclosed above, in some examples, the transform can reduce drift at the output of the sensor during a settled portion of the output. Some examples of the disclosure are directed to a non-transitory computer readable storage medium storing one or more programs, the one or more programs comprising instructions, which when executed by a device including one or more processors, causes the device to perform a method according to any of the above methods.

Some examples of the disclosure are directed to an apparatus. The apparatus can comprise a sensor and a receiver channel coupled to an output of the sensor. The receiver channel can comprising a processor configured to window a plurality of samples continuously sampled from the output of the sensor with a tailored window. The tailored window can be generated based on a characterization of the sensor response under multiple operating conditions. Additionally or alternatively to one or more of the examples disclosed above, in some examples, the tailored window can apply greater weight to samples taken during a settled portion of the output than to samples taken during an unsettled portion of the output. Additionally or alternatively to one or more of the examples disclosed above, in some examples, the tailored window can be an optimized window.

Some examples of the disclosure are directed to a method. The method can comprise characterizing a sensor response under multiple device conditions and generating, based on the characterization of the sensor response, a tailored window. The tailored window can attribute more weight to samples taken during a settled portion of the output than to samples taken during an unsettled portion of the output. Additionally or alternatively to one or more of the examples disclosed above, in some examples, the tailored window can be an optimized window. Some examples of the disclosure are directed to a non-transitory computer readable storage medium storing one or more programs, the one or more programs comprising instructions, which when executed by a device including one or more processors, causes the device to perform a method according to any of the above methods.

Some examples of the disclosure are directed to a method. The method can comprise monitoring operating conditions of a sensing system including a sensor, dynamically selecting, based on the operating conditions, a sampling mode from one of a discrete sampling mode, a quasi-continuous sampling mode and a continuous sampling mode, and sampling an output of the sensor according to the selected sampling mode. Additionally or alternatively to one or more of the examples disclosed above, in some examples, the method can further comprise: based on the operating conditions, equalizing the output of the sensor. Additionally or alternatively to one or more of the examples disclosed above, in some examples, the method can further comprise: based on the operating conditions, windowing the output of the sensor with a tailored window. Some examples of the disclosure are directed to a non-transitory computer readable storage medium storing one or more programs, the one or more programs comprising instructions, which when executed by a device including one or more processors, causes the device to perform a method according to any of the above methods.

Some examples of the disclosure are directed to a touch sensing system. The system can comprise a sensor and a processor coupled to the sensor. The processor can be capable of monitoring operating conditions of the touch sensing system, dynamically selecting, based on the operating conditions, a sampling mode from one of a discrete sampling mode, a quasi-continuous sampling mode and a continuous sampling mode, and sampling an output of the sensor according to the selected sampling mode. Additionally or alternatively to one or more of the examples disclosed above, in some examples, the processor can be further capable of: based on the operating conditions, equalizing the output of the sensor. Additionally or alternatively to one or more of the examples disclosed above, in some examples, the processor can be further capable of: based on the operating conditions, windowing the output of the sensor with a tailored window.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

What is claimed is:

1. An apparatus comprising:
a sensor configured to be coupled to an electrode of a touch sensor panel; and
one or more processors coupled to the sensor and configured to:
select a first excitation signal and a first sampling window, wherein the first sampling window corresponds to a settled portion of an output of the sensor in which the output is within a threshold of a predetermined settled value, and wherein the first sampling window and the first excitation signal are selected based on at least one of a drift specification and an interference specification;
stimulate the sensor with the first excitation signal;
in response to stimulating the sensor with the first excitation signal, sample the sensor a plurality of times during the first sampling window, without sampling the sensor while the sensor is coupled to the electrode of the touch sensor panel before the first sampling window, to generate a first plurality of samples; and
generate a first capacitance measurement for the sensor based on the first plurality of samples.

2. The apparatus of claim 1, the one or more processors further configured to:
select a second excitation signal and a second sampling window, wherein at least one of the second excitation signal and the second sampling window is different than the first excitation signal and the first sampling window;
stimulate the sensor with the second excitation signal;
sample the sensor a plurality of times during the second sampling window to generate a second plurality of samples; and
generate a second capacitance measurement for the sensor based on the second plurality of samples.

3. The apparatus of claim 2, wherein the first plurality of samples includes a different number of samples than the second plurality of samples.

4. The apparatus of claim 2, wherein the first excitation signal and the second excitation signal have the same fundamental frequencies.

5. The apparatus of claim 2, wherein the first excitation signal and the second excitation signal have different fundamental frequencies.

6. The apparatus of claim 1, wherein generating the first capacitance measurement for the sensor based on the first plurality of samples comprises windowing the first plurality of samples with a window function.

7. The apparatus of claim 1, wherein the first excitation signal has a trapezoidal waveform.

8. The apparatus of claim 2, wherein the second sampling window and the second excitation signal are selected based on at least one of the drift specification and the interference specification.

9. The apparatus of claim 1, wherein the first sampling window and the first excitation signal are selected based on at least one of a temperature variation, a mode of operation, an interference profile and a scan type.

10. A method comprising:
selecting a first excitation signal and a first sampling window, wherein the first sampling window corresponds to a settled portion of an output of the sensor in which the output is within a threshold of a predetermined settled value, and wherein the first sampling window and the first excitation signal are selected based on at least one of a drift specification and an interference specification;
stimulating a sensor with the first excitation signal, the sensor configured to be coupled to an electrode of a touch sensor panel;
in response to stimulating the sensor with the first excitation signal, sampling the sensor a plurality of times during the first sampling window, without sampling the sensor while the sensor is coupled to the electrode of the touch sensor panel before the first sampling window, to generate a first plurality of samples; and
generating a first capacitance measurement for the sensor based on the first plurality of samples.

11. The method of claim 10, further comprising:
selecting a second excitation signal and a second sampling window, wherein at least one of the second excitation signal and the second sampling window is different than the first excitation signal and the first sampling window;
stimulating the sensor with the second excitation signal;
sampling the sensor a plurality of times during the second sampling window to generate a second plurality of samples; and
generating a second capacitance measurement for the sensor based on the second plurality of samples.

12. The method of claim 10, wherein generating the first capacitance measurement for the sensor based on the first plurality of samples comprises windowing the first plurality of samples with a window function.

13. The method of claim 11, wherein the second sampling window and the second excitation signal are selected based on at least one of the drift specification and the interference specification.

14. The method of claim 10, wherein the first sampling window and the first excitation signal are selected based on at least one of a temperature variation, a mode of operation, an interference profile and a scan type.

15. A non-transitory computer readable storage medium storing one or more programs, the one or more programs comprising instructions, which when executed by a device including one or more processors, causes the device to perform a method comprising:

selecting a first excitation signal and a first sampling window, wherein the first sampling window corresponds to a settled portion of an output of the sensor in which the output is within a threshold of a predetermined settled value, and wherein the first sampling window and the first excitation signal are selected based on at least one of a drift specification and an interference specification;

stimulating a sensor with the first excitation signal, the sensor configured to be coupled to an electrode of a touch sensor panel;

in response to stimulating the sensor with the first excitation signal, sampling the sensor a plurality of times during the first sampling window, without sampling the sensor while the sensor is coupled to the electrode of the touch sensor panel before the first sampling window, to generate a first plurality of samples; and generating a first capacitance measurement for the sensor based on the first plurality of samples.

16. The non-transitory computer readable storage medium of claim 15, the method further comprising:

selecting a second excitation signal and a second sampling window, wherein at least one of the second excitation signal and the second sampling window is different than the first excitation signal and the first sampling window;

stimulating the sensor with the second excitation signal;

sampling the sensor a plurality of times during the second sampling window to generate a second plurality of samples; and generating a second capacitance measurement for the sensor based on the second plurality of samples.

17. The non-transitory computer readable storage medium of claim 15, wherein generating the first capacitance measurement for the sensor based on the first plurality of samples comprises windowing the first plurality of samples with a window function.

18. The non-transitory computer readable storage medium of claim 16, wherein the second sampling window and the second excitation signal are selected based on at least one of the drift specification and the interference specification.

19. The non-transitory computer readable storage medium of claim 15, wherein the first sampling window and the first excitation signal are selected based on at least one of a temperature variation, a mode of operation, an interference profile and a scan type.

* * * * *